United States Patent
Shaw et al.

(10) Patent No.: US 12,461,920 B2
(45) Date of Patent: *Nov. 4, 2025

(54) SYSTEM AND METHOD FOR CREATING A FILTERING PROTOCOL-COMPLIANT UNIFORM RESOURCE LOCATOR

(71) Applicant: Hexagon Technology Center GmbH, Heerbrugg (CH)

(72) Inventors: Scott David Shaw, Stockley (GB); Jack Llewellyn Cockerell, Kemble (GB)

(73) Assignee: Hexagon Technology Center GmbH, Heerbrugg (CH)

( * ) Notice: Subject to any disclaimer, the term of this patent is extended or adjusted under 35 U.S.C. 154(b) by 82 days.

This patent is subject to a terminal disclaimer.

(21) Appl. No.: 18/243,854

(22) Filed: Sep. 8, 2023

(65) Prior Publication Data

US 2023/0418828 A1 Dec. 28, 2023

Related U.S. Application Data

(63) Continuation-in-part of application No. 18/225,412, filed on Jul. 24, 2023, now Pat. No. 12,307,083, (Continued)

(51) Int. Cl.
*G06F 16/955* (2019.01)
*G06F 16/242* (2019.01)
(Continued)

(52) U.S. Cl.
CPC .... *G06F 16/24573* (2019.01); *G06F 16/2445* (2019.01)

(58) Field of Classification Search
CPC .......... G06F 16/2445; G06F 16/24573; G06F 16/955; G06F 16/957
(Continued)

(56) References Cited

U.S. PATENT DOCUMENTS 7,519,688 B2 * 4/2009 Behrens .................. H04L 67/04
709/227
8,429,189 B1 4/2013 Spielberg et al.
(Continued)

OTHER PUBLICATIONS

Author Unknown—Oasis Committee Note "What's New in Odata," Version 4.01, dated Sep. 26, 2019, 488 pages.
(Continued)

*Primary Examiner* — Jude Jean Gilles
(74) *Attorney, Agent, or Firm* — Nutter McClennen & Fish LLP

(57) ABSTRACT

A graphical user interface is configured to guide a user through a method of creating a RESTful API protocol-compliant URL, without requiring that the user be familiar with syntax of the RESTful API protocol. The graphical user interface includes a URL output that indicates to the user features within a user-edited URL that render the user-edited URL non-compliant with the RESTful API protocol. The graphical user interface includes a set of graphical input devices to solicit and receive from the user input specifying a set of query options, which user input is used to define the RESTful API protocol-compliant URL. The graphical user interface is automatically customized to solicit and receive from the user input only for options available from a specific data service.

20 Claims, 13 Drawing Sheets

Related U.S. Application Data which is a continuation-in-part of application No. 18/143,809, filed on May 5, 2023, now Pat. No. 12,153,644, which is a continuation-in-part of application No. 18/096,815, filed on Jan. 13, 2023, now Pat. No. 11,995,296, which is a continuation-in-part of application No. 17/691,877, filed on Mar. 10, 2022, now Pat. No. 11,570,230.

(51) Int. Cl.
  *G06F 16/2457* (2019.01)
  *G06F 16/957* (2019.01)
(58) Field of Classification Search
  USPC .......................................................... 707/722
  See application file for complete search history.

(56) References Cited

U.S. PATENT DOCUMENTS

| | | | |
|---|---|---|---|
| 10,990,516 B1 * | 4/2021 | Merritt | G06F 11/3684 |
| 11,157,882 B1 * | 10/2021 | Liu | G06Q 10/00 |
| 11,182,695 B1 * | 11/2021 | Kirsche | G06N 3/088 |
| 11,244,244 B1 * | 2/2022 | Delgado | G06F 16/24578 |
| 11,570,230 B1 * | 1/2023 | Shaw | H04L 67/561 |
| 11,995,296 B2 * | 5/2024 | Shaw | G06F 9/451 |
| 2006/0155529 A1 | 7/2006 | Ludviksson et al. | |
| 2007/0245039 A1 * | 10/2007 | Dahneke | G06F 9/4411 |
| | | | 710/15 |
| 2010/0235469 A1 | 9/2010 | Morris | |
| 2014/0250377 A1 | 9/2014 | Bisca et al. | |
| 2014/0372956 A1 | 12/2014 | Bisca et al. | |
| 2015/0294377 A1 | 10/2015 | Chow | |
| 2016/0253708 A1 | 9/2016 | Mody et al. | |
| 2017/0012920 A1 | 1/2017 | Chheda et al. | |
| 2017/0021356 A1 | 1/2017 | Dority et al. | |
| 2017/0094017 A1 | 3/2017 | Jakobs | |
| 2017/0155736 A1 | 6/2017 | Schukovets et al. | |
| 2017/0364346 A1 | 12/2017 | Peng et al. | |
| 2018/0107525 A1 | 4/2018 | Govindaraju et al. | |
| 2018/0217818 A1 | 8/2018 | Douglas et al. | |
| 2019/0028360 A1 | 1/2019 | Douglas et al. | |
| 2020/0293680 A1 | 9/2020 | Navarro-Dimm et al. | |

OTHER PUBLICATIONS

Author Unknown—PragmatiQa XOData: "Overview with an Example," doc version 1.3, 12 pages, undated.

* cited by examiner

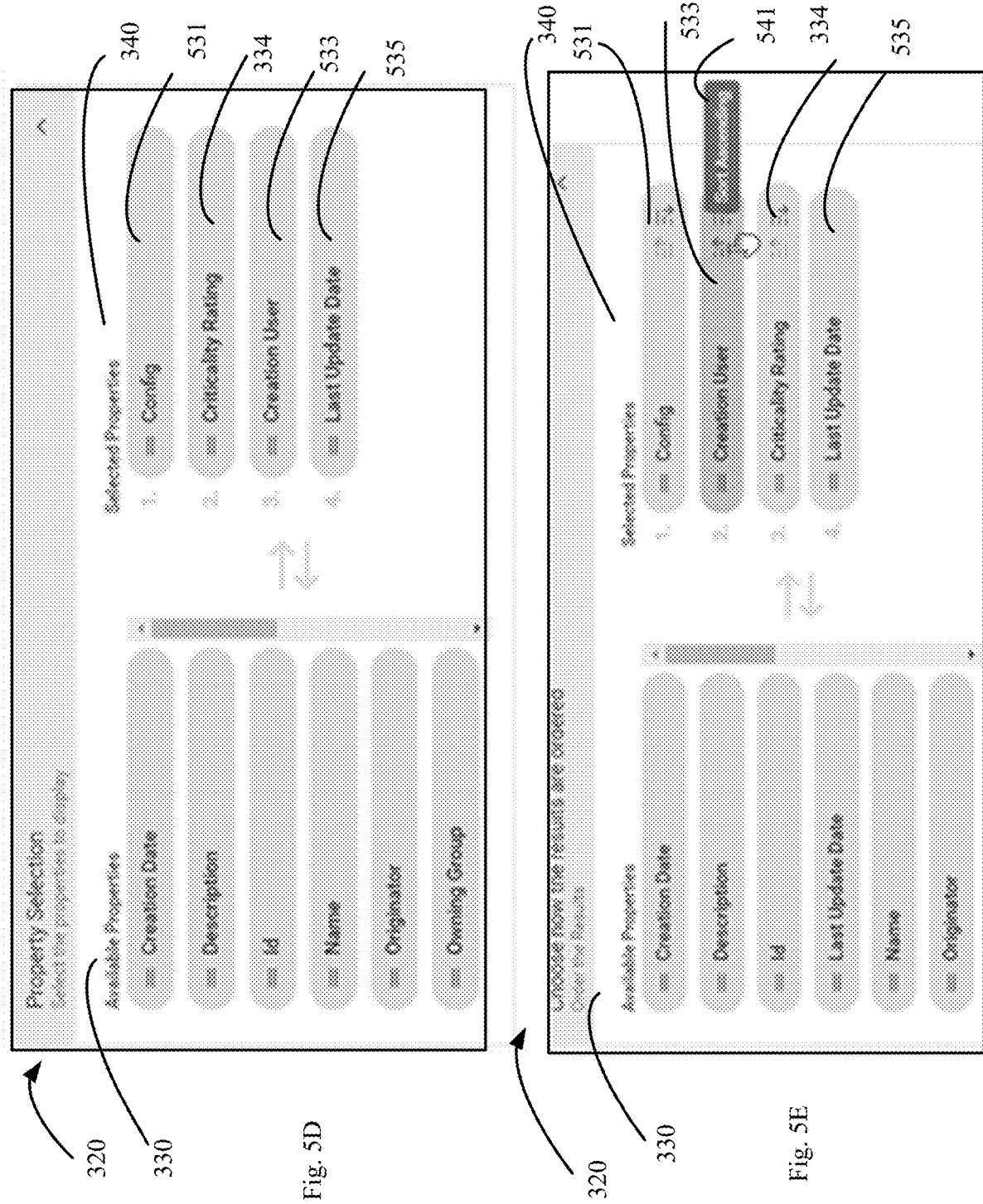

SYSTEM AND METHOD FOR CREATING A FILTERING PROTOCOL-COMPLIANT UNIFORM RESOURCE LOCATOR

RELATED APPLICATIONS

This application is a Continuation-In-Part of U.S. application Ser. No. 18/225,412 filed Jul. 24, 2023 and title "System and Method for Specifying Properties for a Protocol-Compliant Uniform Resource Locator" and naming Scott David Shaw and Jack Llewellyn Cockerell as inventors, which is a Continuation-In-Part of U.S. application Ser. No. 18/143,809, filed May 5, 2023 and titled "System and Method for Validating a Protocol-Compliant Uniform Resource Locator" and naming Scott David Shaw and Jack Llewellyn Cockerell as inventors, which is a Continuation-In-Part of U.S. application Ser. No. 18/096,815, filed Jan. 13, 2023 and titled "System and Method for Creating a Single-Entity Protocol-Compliant Uniform Resource Locator" and naming Scott David Shaw and Jack Llewellyn Cockerell as inventors, which is a Continuation-In-Part of U.S. application Ser. No. 17/691,877, filed Mar. 10, 2022 and titled "System and Method for Creating a Protocol-Compliant Uniform Resource Locator" and naming Scott David Shaw and Jack Llewellyn Cockerell as inventors.

The disclosure of each of the foregoing is incorporated herein by reference, in its entirety.

TECHNICAL FIELD

Embodiments generally relate to requesting data from a remote data source, more particularly, embodiments relate to requesting data from a remote data source having an application program interface.

BACKGROUND ART

Some computer networks allow a requesting computer (or client computer) to request, and retrieve, data from a remote server computer. An example familiar to Internet users is clicking on a link in a web browser, or entering a uniform resource locator ("URL") into a web browser. Each of those actions causes the client to send a request for content across the Internet to the server, and in response the server sends its content across the Internet to the client. In that familiar scenario, the response from, the server includes whatever the server stores at that moment it receives the request from the client, although the server may also add other content. For example, a server hosting a news site would send whatever news stories were posted on the site at the moment the server received the request, and may include advertising content in additions to the news stories. Either way, the client's request is open ended, and simply causes the server to send whatever the server has or wants to send. In other words, standard URLs do not allow the client to tailor the information it requests and receives from the server.

SUMMARY OF VARIOUS EMBODIMENTS

Illustrative embodiments allow a user to edit a uniform resource locator for requesting source data from the data service, and then identify to the user, via a graphical user interface, errors in the user-edited URL that cause the user-edited URL to fail to comply with a RESTful API protocol.

A first embodiment provides a method of creating a uniform resource locator that complies with a RESTful API protocol (a "protocol-compliant" URL) at a computer remote from a data service. The method includes obtaining, from a metadata source, metadata describing source data available from the data service; customizing a graphical user interface ("GUI") by populating a set of graphical input devices within the GUI with information specified by the metadata, such that the GUI is configured to solicit and receive user input specifying a set of query options to request, from the data service, data available from the data service. The set of graphical input devices includes a set of filter input devices includes: (i) a first property input device configured to receive from a user specification of a first property of the source data; (ii) a first value input device corresponding to the property input device and configured to receive from the user specification of a first value; and (iii) a first operator input device corresponding to the first property input device and its corresponding first value input device and configured to receive from the user specification of a first operator to apply to the user input received, respectively, by the first property input device and the first value input device, the first property of the source data and the first value and the second operator defining a first filter.

The method further includes receiving user input via the graphical user interface; and generating the protocol-compliant uniform resource locator by application of a set of rules to the user input, the protocol-compliant uniform resource locator including the first filter configured to solicit from the data service a subset of the source data selected in accordance with the first value of the first property defined by the operator.

In some embodiments of a method, the first operator includes an EQUALS function, such that the filter is configured to generate a protocol-compliant uniform resource locator configured to solicit from the data service a subset of the source data, said subset having the value of the first property defined by the operator.

In some embodiments of a method, the first operator includes a NOT EQUALS function, such that the filter is configured to generate a protocol-compliant uniform resource locator configured to solicit from the data service a subset of the source data, said subset having a value of the property that is not equal to the first property defined by the operator.

In some embodiments of a method, the set of filter input devices further includes: (i) a second property input device configured to receive from a user specification of a second property of the source data; (ii) a second value input device corresponding to the second property input device and configured to receive from the user specification of a second value; and (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter. In such embodiments, the protocol-compliant uniform resource locator including, in addition to the first filter, the second filter configured to generate the protocol-compliant uniform resource locator configured to solicit from the data service a subset of the source data selected in accordance with the second value of the second property defined by the operator.

In some embodiments of a method, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter.

In some embodiments of a method, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter, the conjunction operator selected from one of: (a) an AND function, such that the protocol-compliant uniform resource locator is configured to solicit from the data service a subset of the source data selected, which subset is described by both the first filter and the second filter; and (b) an OR function, such that the protocol-compliant uniform resource locator is configured to solicit from the data service a subset of the source data selected, which subset is described by either of the first filter or the second filter, or is described by both the first filter and the second filter.

In some embodiments of a method, the graphical user interface further includes a URL output device configured to display a protocol-compliant URL that generated based on user input received by the graphical user interface.

Yet another embodiment provides a computer-implemented system for creating a uniform resource locator that complies with a RESTful API protocol, said uniform resource locator being a "protocol-compliant" URL, for requesting source data from a data service. The system includes a communications interface configured to obtain, from a metadata source, metadata describing source data available from the data service; a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service. In such embodiments, the set of graphical input devices includes a set of filter input devices including: (i) a first property input device configured to receive from a user specification of a first property of the source data; (ii) a first value input device corresponding to the property input device and configured to receive from the user specification of a first value; and (iii) a first operator input device corresponding to the first property input device and its corresponding first value input device and configured to receive from the user specification of a first operator to apply to the user input received, respectively, by the first property input device and the first value input device, the first property of the source data and the first value and the second operator defining a first filter.

The system also includes a protocol-compliant URL generator configured: to receive user input including receipt of user in put via the set of filter input devices; and to apply a set of rules to the user input to produce, from said user input, a protocol-compliant URL.

In some embodiments of the system, the first operator includes an EQUALS function, such that the filter is configured to generate a protocol-compliant uniform resource locator configured to solicit from the data service a subset of the source data, said subset having the value of the first property defined by the operator.

In some embodiments of the system, the first operator includes a NOT EQUALS function, such that the filter is configured to generate a protocol-compliant uniform resource locator configured to solicit from the data service a subset of the source data, said subset having a value of the property that is not equal to the first property defined by the operator.

In some embodiments of the system, the set of filter input devices further includes: (i) a second property input device configured to receive from a user specification of a second property of the source data; (ii) a second value input device corresponding to the second property input device and configured to receive from the user specification of a second value; and (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter.

In such embodiments, the protocol-compliant uniform resource locator includes, in addition to the first filter, the second filter configured to generate the protocol-compliant uniform resource locator configured to solicit from the data service a subset of the source data selected in accordance with the second value of the second property defined by the operator.

In some embodiments of the system, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter.

In some embodiments of the system, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter, the conjunction operator selected from one of: (a) an AND function, such that the protocol-compliant uniform resource locator is configured to solicit from the data service a subset of the source data selected, which subset is described by both the first filter and the second filter; and (b) an OR function, such that the protocol-compliant uniform resource locator is configured to solicit from the data service a subset of the source data selected, which subset is described by either of the first filter or the second filter, or is described by both the first filter and the second filter.

In some embodiments of the system, the graphical user interface further includes a URL output device configured to display a protocol-compliant" URL that generated based on user input received by the graphical user interface.

Yet another embodiment provides a non-transitory computer-readable medium having computer code thereon, the computer code configured to be executed by a computer, the computer code causing the computer to execute a method including: obtaining, from a metadata source, metadata describing source data available from the data service; customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices includes a set of filter input devices including: (i) a first property input device configured to receive from a user specification of a first property of the source data; (ii) a first value input device corresponding to the property input device and configured to receive from the user specification of a first value; and (iii) a first operator input device corresponding to the first property input device and its corresponding first value input device and configured to receive from the user specification of an operator to apply to the user input received, respectively, by the first property input device and the first value input device, the first property of the source data and the first value and the second operator defining a first filter.

Such embodiments also include receiving user input via the graphical user interface; and generating the protocol-compliant uniform resource locator by application of a set of rules to the user input, the protocol-compliant uniform resource locator including the first filter configured to solicit from the data service a subset of the source data selected in accordance with the first value of the first property defined by the operator.

In some such embodiments, the first operator includes an EQUALS function, such that the filter is configured to generate a protocol-compliant uniform resource locator configured to solicit from the data service a subset of the source data, said subset having the value of the first property defined by the operator.

In some such embodiments, the first operator includes a NOT EQUALS function, such that the filter is configured to generate a protocol-compliant uniform resource locator configured to solicit from the data service a subset of the source data, said subset having a value of the property that is not equal to the first property defined by the operator.

In some such embodiments, the set of filter input devices further includes: (i) a second property input device configured to receive from a user specification of a second property of the source data; (ii) a second value input device corresponding to the second property input device and configured to receive from the user specification of a second value; and (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter. In such embodiments, the protocol-compliant uniform resource locator includes, in addition to the first filter, the second filter configured to generate the protocol-compliant uniform resource locator configured to solicit from the data service a subset of the source data selected in accordance with the second value of the second property defined by the operator.

In some embodiments, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter.

In some embodiments, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter, the conjunction operator selected from one of: (a) an AND function, such that the protocol-compliant uniform resource locator is configured to solicit from the data service a subset of the source data selected, which subset is described by both the first filter and the second filter; and (b) an OR function, such that the protocol-compliant uniform resource locator is configured to solicit from the data service a subset of the source data selected, which subset is described by either of the first filter or the second filter, or is described by both the first filter and the second filter.

BRIEF DESCRIPTION OF THE DRAWINGS

Those skilled in the art should more fully appreciate advantages of various embodiments from the following "Description of Illustrative Embodiments," discussed with reference to the drawings summarized immediately below.

FIG. 5B, FIG. 5C, FIG. 5D and FIG. 5E each schematically illustrates an embodiment of a graphical user interface configured to receiver user input selecting properties for a protocol-compliant URL.

DESCRIPTION OF ILLUSTRATIVE EMBODIMENTS

Figure 1A:
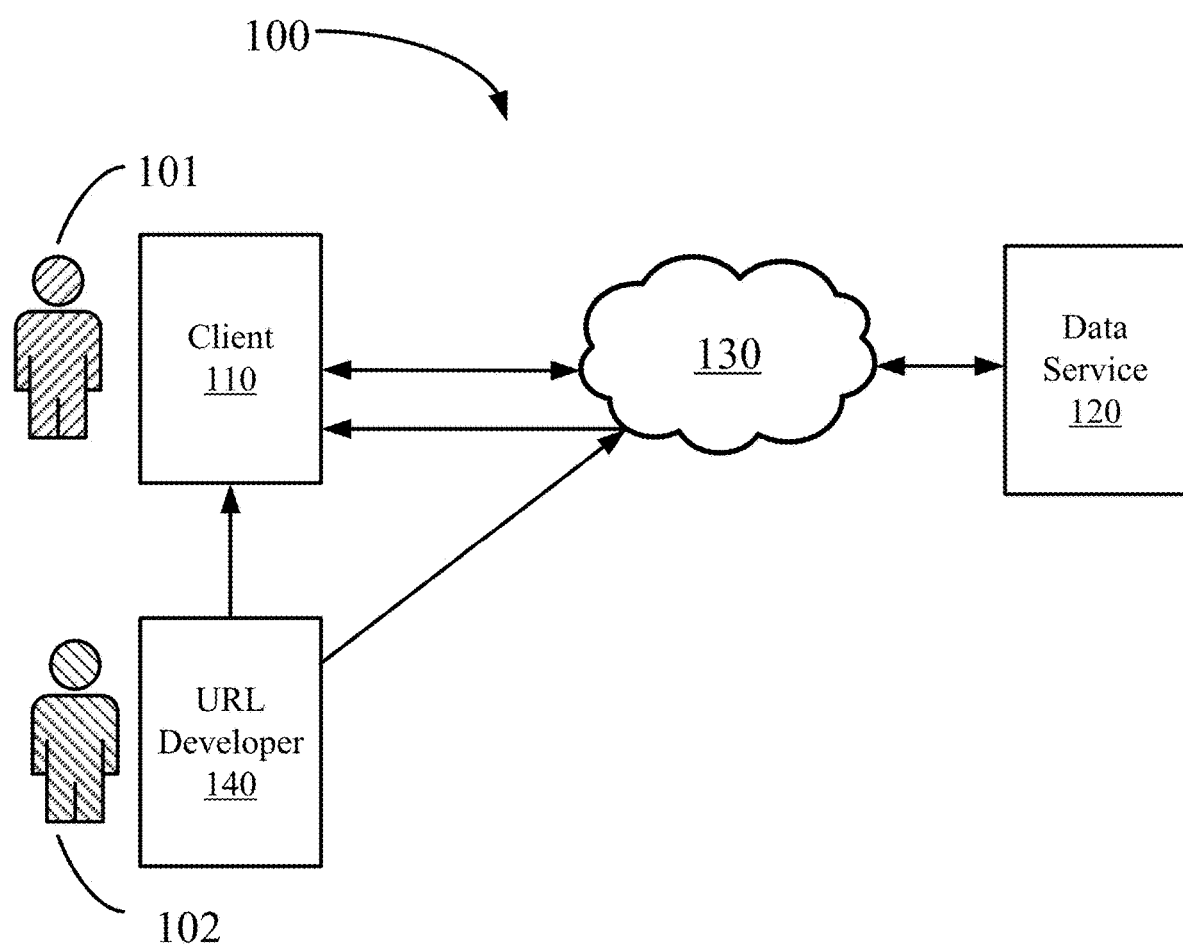
FIG. 1A schematically illustrates a system environment according to illustrative embodiments.

Illustrative embodiments address issues arising in creation of a protocol-compliant URL for use within a system of networked computers. Indeed, the issues arise from the field of computers communicating with one another over a network.

Specifically, illustrative embodiments make creating protocol-compliant URLs (such as an OData-compliant URLs and OpenAPI-compliant URLs) available to non-technical users without requiring such users to learn the complex syntax and other details of the standard.

Taking OData as an example, creating an OData-compliant URL historically required the creator to understand the intricacies of the OData specification, such as its specific terminology, and its complex syntax. The OData 4.01 standard is incorporated herein, in its entirety, by reference. The OData 4.01 standard is available, as of this writing, at http://docs.oasis-open.org/odata/odata/v4.01/and also at https://www.odata.org/documentation/.

Moreover, in order to create an OData-compliant URL for use with a OData service (e.g., a remote server storing data, and configured to receive and respond to an OData-compliant query), the creator would be required to query the OData service to determine what data is available, and what parameters may be searched using the OData-compliant URL. Executing such a query, and interpreting the result, required the creator to possess additional understanding of the OData specification.

Consequently, the complexity of the OData specification, and of OData-compliant URLs, and the process of creating OData-compliant URLs, made the creation of OData-compliant URLs impossible for anyone without a deep knowledge of the OData specification.

In contrast, illustrative embodiments automate portions of the process of creating a protocol-compliant URL, and enable a user to create a protocol-compliant URL, all without requiring the user to have a detailed understanding of the associated standard. For example, illustrative embodiments automatically create a customized user interface, which user interface is customized based on source data available from a data service, and functions that said data service is capable of performing, and by applying a set of rules to user input to create from said user input a protocol-compliant URL.

Definitions: As used in this description and the accompanying claims, the following terms shall have the meanings indicated, unless the context otherwise requires.

A "data service" (or "datasource") is a computer (e.g., a server) that stores source data, and that is configured to comply with a specification (or protocol) for an API that enables the computer to understand and provide responsive data in response to receipt, at the computer from a remote client, of a protocol-compliant URL. In typical embodiments, the computer is also configured to respond to receipt, at the computer from a remote client, of a request for a metadata document associated with and descriptive of data stored on the computer.

The term "graphical user interface" (or "GUI") means a form of computer-user interface that allows users to interact with a computer at least in part through graphical devices displayed on a computer display screen. Examples of graphical devices may include a graphical icon, a menu (including a drop-down menu), a window, and a pane, to name but a few examples. A data entry area (e.g., a rectangle) that is associated with another graphical device and that is configured to receive alpha-numeric input from a user (e.g., where the alpha-numeric input is solicited by such other graphical device) is also an example of a graphical device. A command-line, and a text editor, without more, is not a graphical user interface.

The term "responsive data" means source data produced by a data service in response receipt from a client of a protocol-compliant URL.

A "metadata document" is a document that includes metadata that describes the source data available at a data service. Metadata in a metadata document identifies one or more of columns (or "categories" or "entities") of source data; relationships among columns of source data; number of records of source data, or number of records in each column of source data, type of source data (e.g., text; number; date), the format of source data (e.g., Microsoft Word; spreadsheet; flat file; .pdf; .jpg; .mpg, etc.), available properties on which the data service can filter the source data, to name but a few examples.

For example, an "OData Metadata Document," pursuant to the Open Data Protocol, describes entities, relationship entity sets, actions, and functions. Generally speaking, a metadata document associated with an OData service describes at least one of the types, sets, functions (or "data retrieval functions") and actions understood by the OData service. Clients can use the metadata document to understand how to query and interact with entities in the data service. A client may retrieve the "OData Metadata Document" associated with an OData service, for example by sending from the client to the OData service a "$metadata" call (or "request"), as defined by the Open Data Protocol, which returns to the client from the OData Metadata Document associated with that OData service. For example, in illustrative embodiments, a $metadata request from a client to an OData service causes the OData service to send to the client an EDMX document (an XML file that defines an Entity Data Model ("EDM")] that contains a complete description of the feeds, types, properties, functions (data retrieval functions), and relationships exposed by that OData service.

The term "OData" refers to the Open Data, which is an open protocol that allows the creation and consumption of queryable and interoperable representational state transfer ("REST") application programming interface (API) (together, "REST APIs") in a standard way. OData is approved by the International Organization for Standardization (ISO) and the International Electrotechnical Commission (IEC), and is an Organization for the Advancement of Structured Information Standards standard that defines a set of best practices for building and consuming representational REST APIs. The Open Data Protocol is specified by a standard generally referred-to as "OData." For example, OData 4.0 was published by the International Organization for Standardization as "ISO/IEC 20802." As of Sep. 26, 2019, the current OData standard was OData Version 4.01. The inventors anticipate that the Open Data Protocol will continue to evolve. The concepts and embodiments disclosed herein are not limited to OData, and are OData embodiments are not limited to a specific version of the Open Data Protocol.

A "protocol-compliant URL" is a URL that complies with a specification (or protocol) for an API that, in general, allows the creation and consumption of queryable and interoperable REST APIs in a standard way (e.g., allows both humans and computers to discover and understand the capabilities of a data service) without requiring access to source code, additional documentation, or inspection of network traffic. Such specifications include the Open Data Protocol ("OData") specification and the OpenAPI specification, to name but a few examples. A URL that merely complies with the hypertext transfer protocol ("http") is not a protocol-compliant URL.

An object at a data service is "related to" another object at the data service, in some embodiments, because the object and the another object at the data service have been classified, at the data service 120, as being related to one another. In some embodiments, an object at a data service is "related to" another object at the data service because the object and such another object share a tag in common with one another.

In some embodiments, an object at a data service is "related to" another object at the data service because the object and such another object share some common subject matter. For example, if the object is a payroll record of a specific employee, then other payroll records of that specific employee are related objects to that object.

A "set" includes at least one member. Unless otherwise specified, a set may include as few as a single member, or may include a plurality of members. For example, unless otherwise specified: a set of parameters may include a single parameter or a plurality of parameters; a set of rules may include a single rule or a plurality of rules; a set of records may include a single record or a plurality of records, etc.

The term "source data," with regard to data stored by a data service, means data from which the data service may compose responsive data. Each item of source data typically is classified into one of a plurality of categories, where each category may be referred-to as an "entity" or as a "column" of source data. The source data in a first column may have a relationship with source data in a second column, and the source data (or a subset of source data) may be specified or selected by specifying one or more parameters of such a relationship. For example, if the first column contains purchase order numbers, and the second column contains customer indicia (e.g., customer name, customer number, etc.), source data may be selected by specifying just purchase orders (in which case the selected data will include all purchases orders in the source data), or by specifying both purchase orders and a customer name (in which case the selected data will include only purchase orders associated with that customer name). In OData, relationships from one entity to another are represented as navigation properties.

FIG. 1A schematically illustrates an environment in which a RESTful API protocol-compliant URL may be used. Illustrative embodiments are described with an OData-compliant URL, but embodiments are not limited to OData compliance.

In FIG. 1A, a data service 120 (e.g., an OData service; an OpenAPI service) holds data, and is configured to receive (from a requestor such as requestor 101 using client 110) a query from a client 110 wishing to retrieve data from the data service 120. The query is in the form of a protocol-compliant URL. For example, where the data service 120 is an OData service, the data service 120 is configured to receive a query in the form of an OData-compliant URL, and to respond to that query by sending to the requestor 101 all or a subset of the data held by OData service 120.

A requestor 101 at client 110 may desire to retrieve a copy of some or all of the data held by the OData service 120. To that end, the requestor 101 submits a query to OData service 120 via an OData-complaint URL, and the OData service 120 respond by sending, to the client 110, the requested data.

The content of the OData-complaint URL specifies the data requested by the requestor 101, and may also specify other parameters of the response, such as the organization of the requested data in the response.

Such a query, and its associated response, may be transmitted via a network 130. In illustrative embodiments, the network 130 may be a local area network ("LAN"), a wide area network ("WAN"), or the Internet, or any combination of LAN, WAN and the Internet, to name but a few examples.

Note that an OData-complaint URL, and the response to use of an OData-complaint URL, are different from a conventional uniform resource locator used in the Internet and/or the World Wide Web. For example, such a conventional uniform resource locator is a request from a client to a server for the server to send to the client the data held by the server. For example, a URL that specifies the home page of a news website causes the server of the news website to send to the client the content of the home page of the news website as that content exists at the moment the server of the news website receives the request. Such a URL may be thought of as a "dumb" URL in that the receiving server decides what data to send to the requester. Such a dumb URL does not allow the user at the client to tailor a request to specify, to the data source, that the responsive data produced by the data source must include only a subset of the data at the data source.

In contrast, an OData-compliant URL may specify one or more parameters (or "system query options" or "query options") that define (for example, and without limiting all embodiments) the content and order of the responsive data from an OData services 120. System query options in OData include $filter, $select, $orderby, $count, $top, $skip and $expand.

An OData-compliant URL may be created by the requestor 101, or by another creator 102 using URL Developer 140 and supplied to the client 110 (for use by requestor 101) directly, or via the network 130. URL Developer 140 may be part of the client 110, or may be a separate system, for example a separate system implemented on a computer distinct from the computer on which the client 110 is implemented.

Figure 1B:
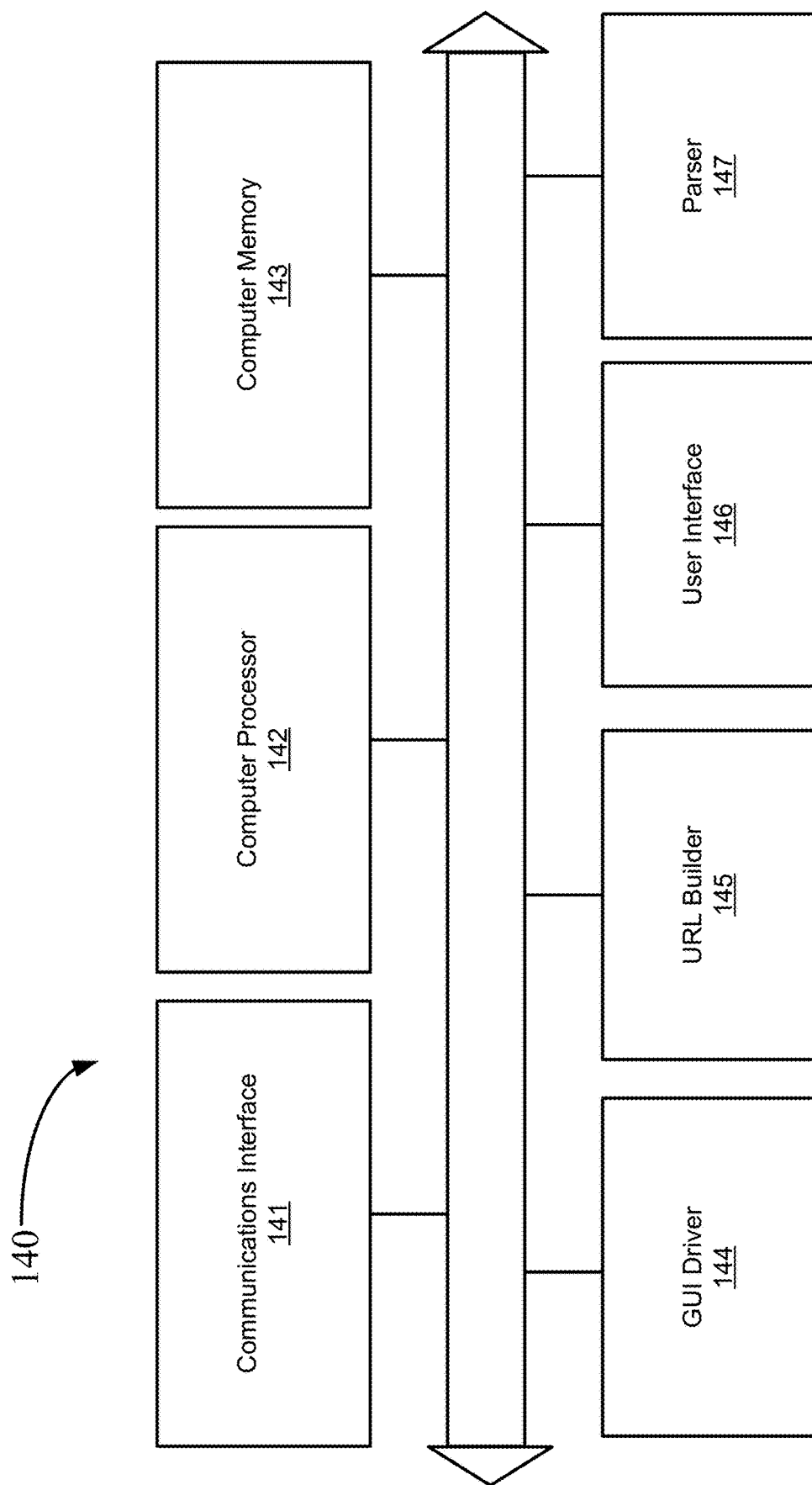
FIG. 1B schematically illustrates an embodiment of a system for generating an OData-compliant URL.

FIG. 1B schematically illustrates an embodiment of a URL developer system 140. In some embodiments, the components of the URL developer system are implemented on the client 110, as mentioned above.

The embodiment of the URL developer system 140 includes a communications interface 141 configured to communicate electronically with client 110 and/or other computers and the OData service 120 via the network 130.

The URL developer system 140 also includes a user interface module configured to present and operate a graphical user interface to allow a human user (e.g., a creator) to provide user input via the graphical user interface to create an OData-compliant URL. Embodiments of such a graphical user interface are described herein.

The URL developer system 140 also includes computer processor hardware 142, such as an i7 processor available from Intel Corporation, or a Ryzen 7 processor available from Advanced Micro Devices, Inc., to name but a few examples.

The URL developer system 140 also includes a computer memory 143 configured to store executable instructions, including instructions that, when executed by the computer processor 142 cause the computer processor 142 to execute methods described herein, including for example presenting a graphical user interface, storing user input received via the graphical user interface, and generating a protocol-compliant URL (e.g., OData-compliant URL) based at least in part on such user input. In illustrative embodiments, computer memory 143 may also (or in addition) be configured to store user input received from a user via a graphical user interface as described herein.

Some embodiments of the URL developer system 140 also include a metadata parser 147 configured to parse metadata from a metadata source (e.g., a metadata document). In some embodiments, the parser 147 is configured to segregate a uniform resource locator into a plurality of segments, wherein each segment can be compared against a set of corresponding formatting requirements defined by the RESTful API protocol to identify each segment of the set of segments that does not comply with its corresponding formatting requirements.

Illustrative embodiments of the URL developer system 140 also include a GUI driver 144 configured to present a graphical user interface as described herein, and to request and receive user input via said graphical user interface. The GUI 144 driver by include a GUI data receiver configured to receive user input (e.g., one or more parameters) to specify details of a request to a data service.

Some embodiments of the URL developer system 140 also include a URL builder 145 configured to create (or construct or generate) an OData-compliant URL based at least in part on user input received via said graphical user interface.

Figure 2:
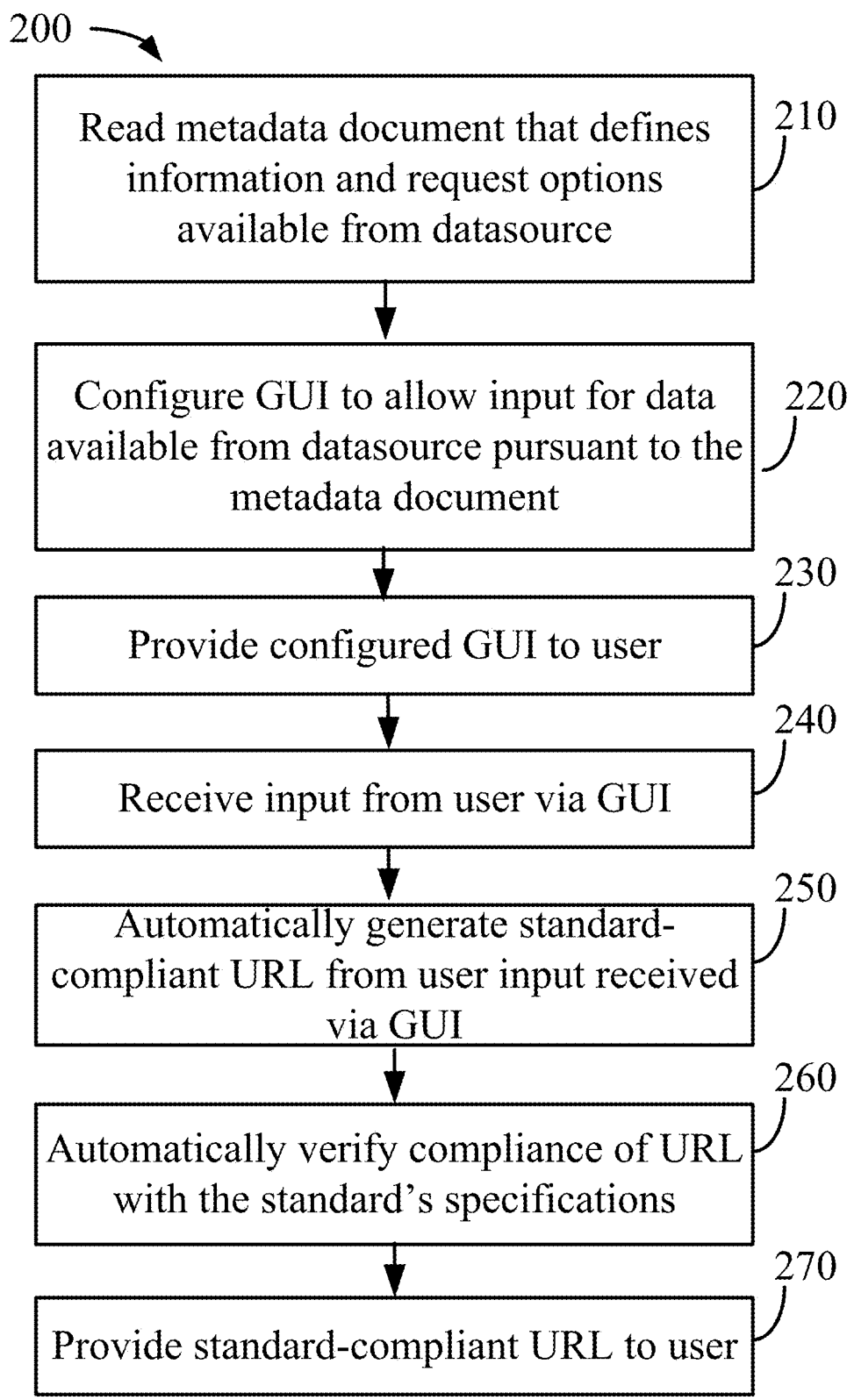
FIG. 2 is a flowchart illustrating steps according to an illustrative embodiment.

FIG. 2 is a flowchart illustrating steps according to an illustrative embodiment of a method 200. In some embodiments, the method 200 is executed by client 110, and in some embodiments the method 200 is executed by URL developer 140, and in some embodiments the method 200 is executed in part by client 110 and in part by URL developer 140.

Step 210 includes reading a metadata source (e.g., a metadata document) data that defines information and request options available from a data service 120 (which may be referred-do as a "source" of data). For embodiments in which the data service 120 is an OData service, the metadata source may be a $metadata document (i.e., a document requested by a client from, and sent to the client by, an OData service). In such embodiments, step 210 includes retrieving a metadata document from the OData service, for example via use of a $metadata call.

Step 210 also includes deriving, from the metadata document, information describing one or more of the types, sets, functions (e.g., data retrieval functions) and actions understood by the data service 120. Data retrieval functions may include, for example, an option that instructs the data service 120 to provide responsive data in a certain order; an option that instructs the data service 120 to limit responsive data to a user-specified number of records; an option that instructs the data service 120 to omit (or skip), from the responsive data, a specified number of records from its data store, to name but a few examples.

Deriving said information from the metadata document may include, in some embodiments, extracting said information by parsing the metadata document. The information describing the types, sets, functions and actions understood by the data service 120 may not include all types, sets, functions and actions available pursuant to the data service's specification (e.g., may not include all types, sets, functions and actions available pursuant to the OData specification, or the OpenAPI specification, to name but a few examples). Instead, the types, sets, functions and actions understood by the data service 120 may include only a subset of such types, sets, functions and actions. In other words, it is not necessary that all data services 120 (e.g., OData services) support or provide all types, sets, functions and actions available pursuant to the specification with which it complies.

Step 220 includes configuring (or "customizing") a graphical user interface pursuant to the metadate from the data service 120, such as information describing the types, sets, functions and actions understood by the data service 120. Some embodiments configure the graphical user interface to request (or solicit) user input only for the types, sets, functions and actions understood by the data service 120 corresponding to the metadata document, and/or to receive user input only for the types, sets, functions and actions understood by the data service 120 corresponding to the metadata document.

For example, if an OData service 120 does not provide or support a certain function defined by the OData specification, step 220 may configure the graphical user interface to refrain from offering to the user the option of selecting that function, and/or may configure the graphical user interface to refrain from accepting input from the user selecting or configuring that function. In other words, that function may be hidden (e.g., not even presented to the user via the graphical user interface) or disabled (e.g., the graphical user interface configured not to accept input selecting or configuring that function). Some embodiments configure or allow the graphical user interface to receive user input even for the types, sets, functions and actions not provided by or available from the OData service 120, but simply ignore such input, or alert the user that such input is not usable for that OData service 120.

Step 230 includes presenting the configured graphical user interface to the user. Here, the user may be a user 101 of the client 110, or a creator 102 using URL developer 140.

Step 240 includes receiving user input via the configured graphical user interface. In illustrative embodiments, step 240 also includes storing said user input, for example in a computer memory 143.

Step 250 then automatically generates a protocol-compliant URL tailored to the types, sets, functions and actions understood by the data service 120. Such a protocol-compliant URL may be referred-to as a "tailored URL" (or a "customized URL"), which tailored URL is based at least in part from user input received via the configured graphical user interface.

Automatically generating a protocol-compliant URL may include editing the user input (e.g., user input received via a graphical user input) into a format compliant with the protocol for which the protocol-compliant URL is to comply, and adding the edited user input to the protocol-compliant URL being generated (or to a previously-constructed portion of such a protocol-compliant URL). For example, in illustrative embodiments, editing such user input may include one or more of adding a prefix to the user input (for example, and without limitation a prefix such as "@" or "$"), and/or adding a suffix to the user input, and/or adding other protocol-specific elements to the user input, such a set of brackets (e.g., "{" and/or "}"; "{{" and/or "}}") or a set of parenthesis (e.g., "(" and/or ")"; "(("and/or"}}"), to name but a few examples. The exact editing, prefixed, suffixes, and/or other protocol-specific elements are defined by the protocol.

For example, when the data service 120 is an OData-compliant data service, step 250 automatically generates an OData-compliant URL based at least in part from user input received via the configured graphical user interface.

Some embodiments include step 260, which includes automatically verifying compliance of a generated URL with its corresponding specification (e.g., the OData specification; the OpenAPI specification, etc.). For example, some embodiments present a tailored URL to the user, for example at URL output device 390, prior to finalizing the URL, and allow the user to edit the URL, for example by typing into URL output device, to create a user-edited URL. Step 260 may identify errors in the user-edited URL that cause the user-edited URL to fail to comply with one or more requirements or specifications. Some embodiments segregate the user-edited URL into one or more segments (e.g., a set of segments; a plurality of segments), and compare each segment against a set of corresponding formatting requirements (for example, formatting characters and syntax requirements) defined by the RESTful API protocol to identify each segment of the set of segments that does not comply with its corresponding formatting requirements. Such corresponding formatting requirements are defined by the RESTful API protocol, and may be stored in a memory, such as computer memory 143). The act of segregating the user-edited URL into one or more segments may be performed, for example, by a parser 147.

For example, a URL (including a user-edited URL) that fails to comply with one or more requirements of the OData specification is not an OData-compliant URL (and may be referred-to as a "non-compliant" URL). A URL (including a user-edited URL) that fails to comply with one or more requirements of the OpenAPI specification is not an OpenAPI-compliant URL (and may be referred-to as a "non-compliant" URL).

In some embodiments, in which a set of corresponding formatting requirements defined by the RESTful API protocol comprises formatting characters and syntax requirements, the method includes comparing each segment of a plurality of segments against a set of corresponding formatting requirements defined by the RESTful API protocol to identify each segment that does not comply with its corresponding formatting requirements by comparing characters of the segment to formatting characters defined by the RESTful API protocol and comparing syntax of the segment to syntax requirements defined by the RESTful API protocol.

Figure 4A:
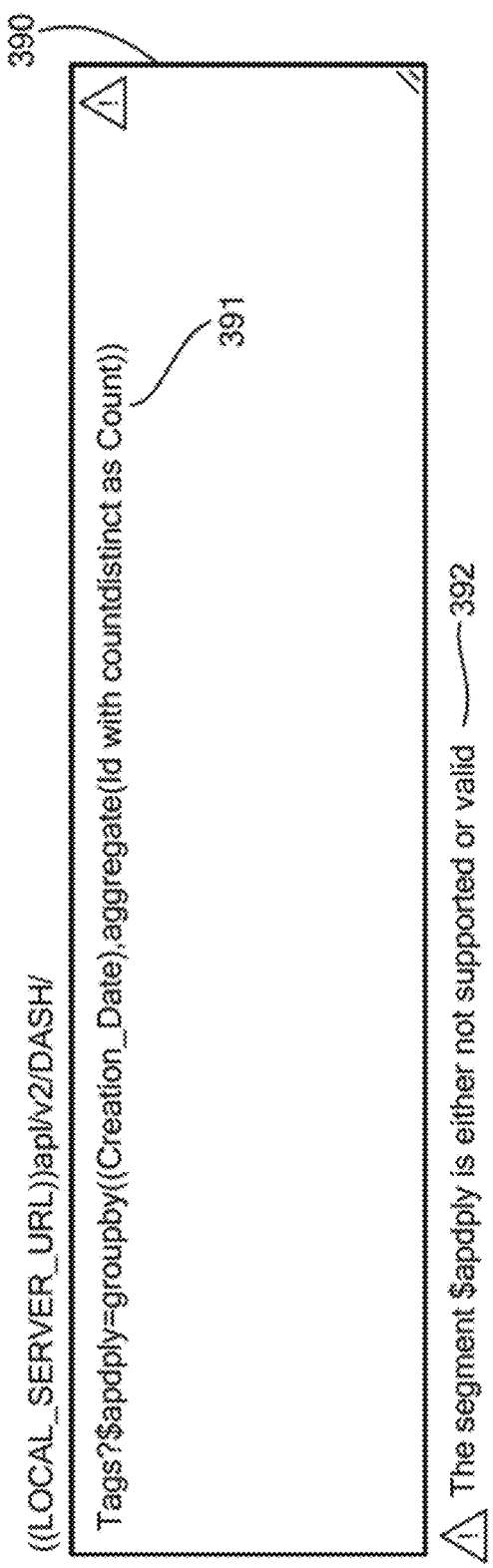
FIG. 4A schematically illustrates an embodiment of a non-compliant URL.
Figure 4B:
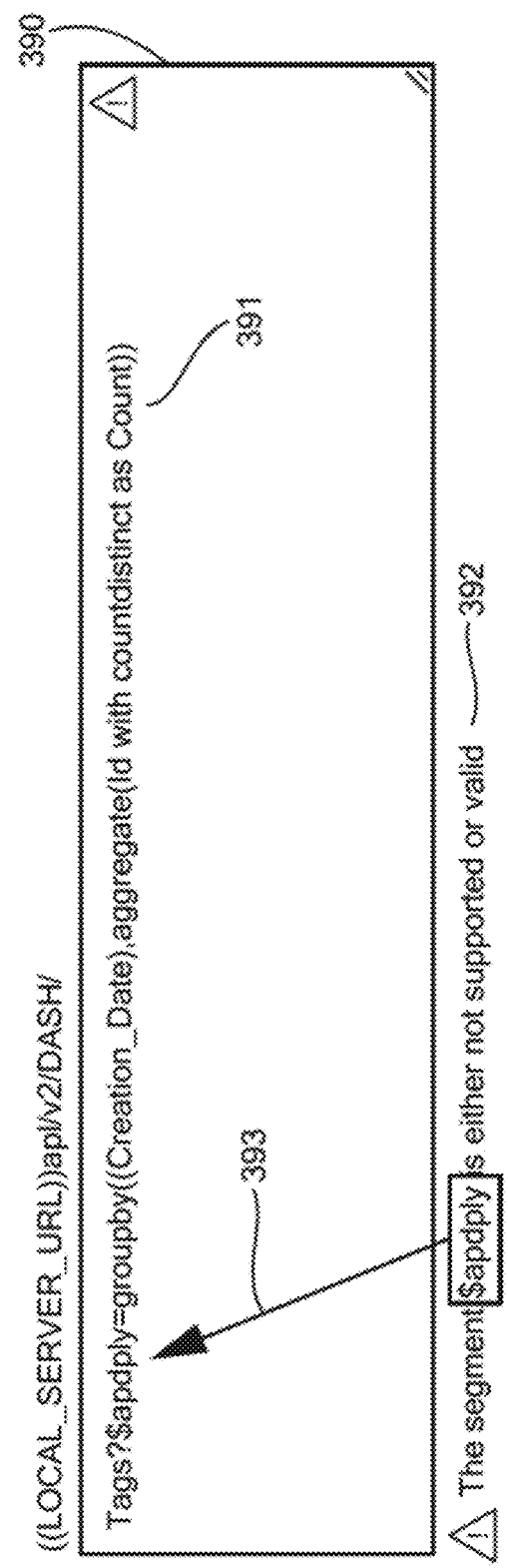
FIG. 4B schematically illustrates an embodiment of a non-compliant URL.
Figure 4C:
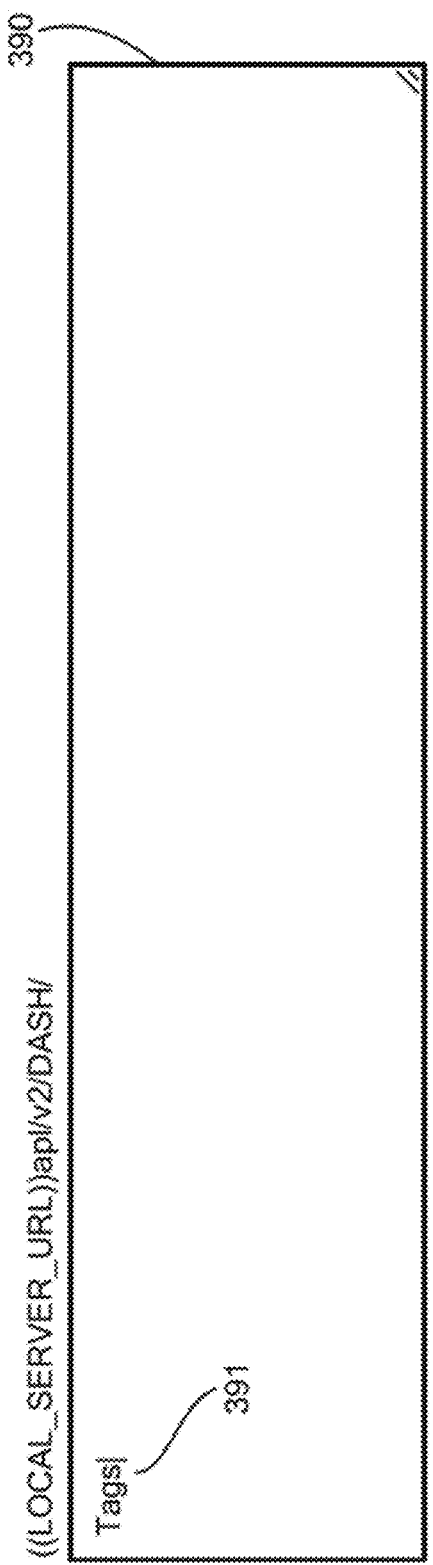
FIG. 4C schematically illustrates an embodiment of a non-compliant URL.

Some such embodiments identify a set of features of a non-compliant URL, for example by underlining, highlighting, or otherwise graphically accentuating such features, so that the user knows what the user needs to correct in order to produce a specification-compliant URL from the non-compliant URL. In other words, some embodiments display markings to explain features within a URL, or a segment of a URL, that cause the URL or segment to fail to comply with the RESTful API protocol. FIG. 4A and FIG. 4C each schematically illustrates an embodiment of a non-compliant URL output that goes beyond underlining, highlighting, or otherwise graphically accentuating features to identify a feature of the URL that causes the URL to be non-compliant. More particularly, as schematically illustrated in each of FIG. 4A and FIG. 4C, some embodiments also, or alternatively, include text 392 to indicate to the user what segment of the URL causes the URL to be non-compliant, so that the user knows what the user needs to correct in order to produce a specification-compliant URL from the non-compliant URL, and to indicate the nature of the problem with that segment of the URL. Some embodiments include a graphical element 393 (e.g., a line or arrow), as schematically illustrated in FIG. 4B, to further identify or emphasize the segment that causes the URL to be non-compliant.

Figure 4D:
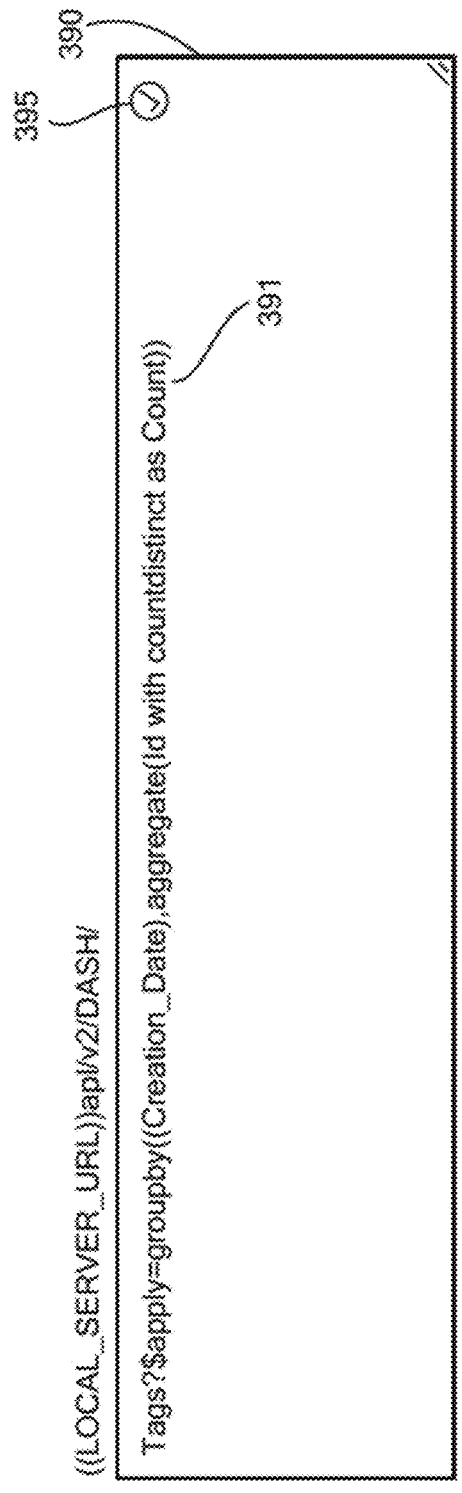
FIG. 4D schematically illustrates an embodiment of a compliant URL.

Some embodiments display a graphical element to indicate that a URL is compliant, such as schematically illustrated in FIG. 4D. For example, when step 260 concludes that a URL is an OData compliant URL, the graphical user interface indicates that the URL is an OData-compliant URL, for example by displaying an icon or other graphical indicator 395, or a text indication, that the URL is an OData-compliant URL.

At step 270, the system 140 provides to the user, and/or to the client 110, the specification-compliant (e.g., OData-compliant; OpenAPI-compliant) URL.

In some embodiments, the graphical user interface includes several screens, each screen presenting a set of input devices to allow a user to provide user input. User input may include specification, by a user, of one or more parameters, which parameters define, for example, the form and/or content of responsive data to be provided by a data service.

Figure 3A:
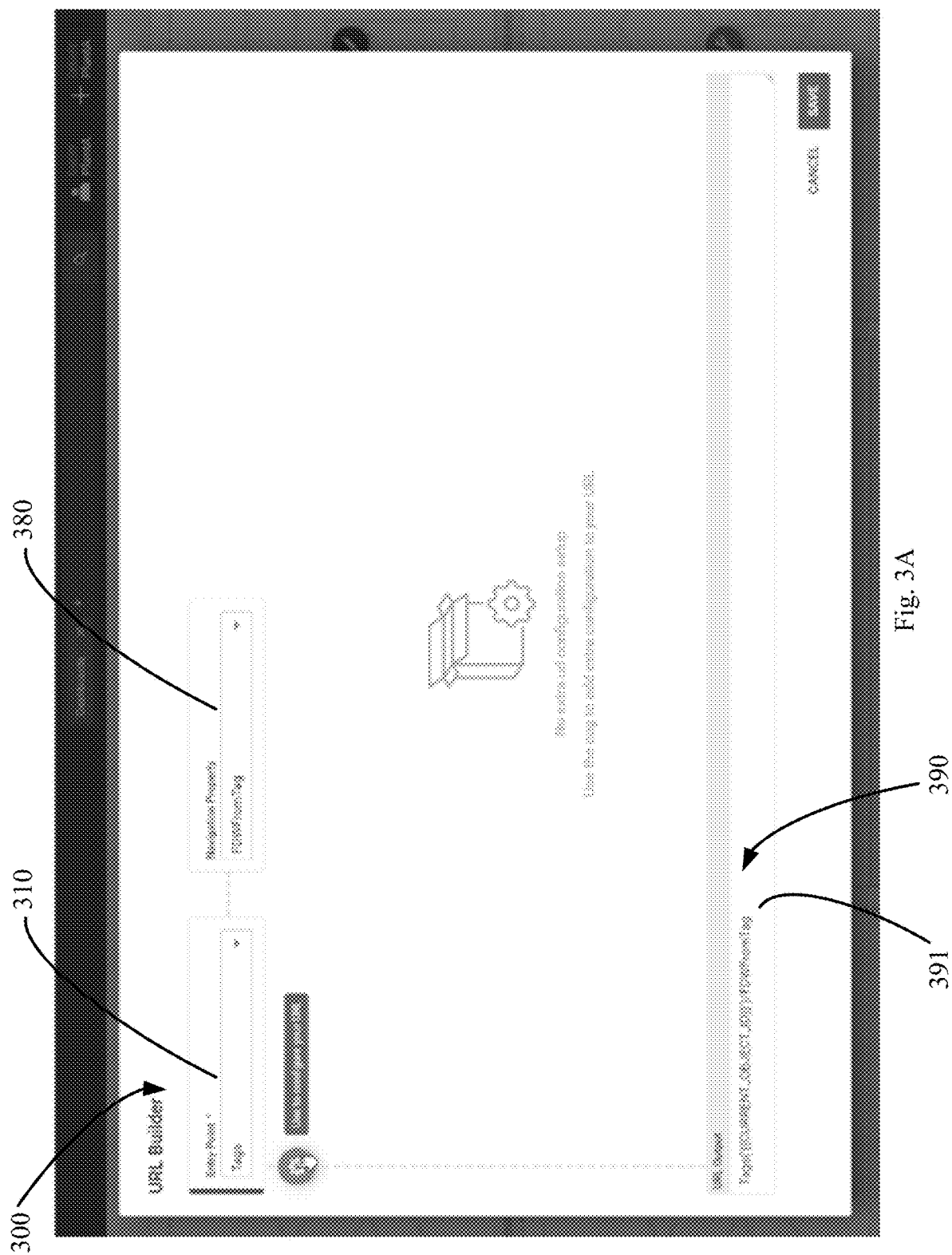
FIG. 3A schematically illustrates an embodiment of a screen of an embodiment of a graphical user interface.

FIG. 3A schematically illustrates an embodiment of a screen of an embodiment of a graphical user interface. In FIG. 3A, the GUI presents a graphical input device 310 (in this example, a drop-down menu, but in other embodiments the input device may be an alpha-numeric entry box) captioned "Entry Point" and another graphical input device 380 (in this example, a drop down menu) captioned "Navigation Property."

The "Entry Point" graphical input device 310, which may also be referred to as an "Entity" graphical input device, solicits, and is configured to receive, from a GUI user selection or specification of a column (or "category" or "entity") of data sought by the user. The content of options available to be input by the user is customized in that it is produced from the metadata provided by the data service 120. In this example, data service 120 holds data grouped into columns. The columns of data available from a data source may be, for example, orders, client name, product ordered, or manufacturing plant, to name but a few examples.

Each column holds data that may be related to data in another column. For example, data in the "orders" column may be related to data in the "client name" column, in that each order in the "orders" column is associated with the name of the client that placed the order.

A drop-down menu under "Entry Point" lists all of those columns of data and makes them selectable by the user. In some embodiments, a text entry box may accept typed input from the user, which input specifies the column of data.

In the example of FIG. 3A, the user has specified (as a first user input parameter) "Tags" as the entry point column of source data.

The "Navigation Property" graphical input device 380 may be a drop-down menu or other input device (e.g., a text entry box) that allows, but in some embodiments does not require, the user to provide an additional parameter to refine the search.

In the example of FIG. 3A, because the user has specified "Tags" as the Entry Point, the user interface 300 has customized the "Navigation Property" input device 380 to provide a drop-down menu listing available tags, as specified by the data service 120 via its metadata document.

In the example of FIG. 3A, the user has used the Navigation Property input device to specify a tag (specifically, "FDWFromTag") that is made available by the data service 120.

Consequently, keeping with the example of FIG. 3A, the specified Entry Point parameter and the specified Navigation Property parameter specify that the protocol-compliant URL request, from the data service 120, source data from the "Tags" column of source data, which source data is limited to data tagged as "FDWFromTag." In this example, the method or system would consume that user input and produce the following OData-compliant URL at URL output device 390:

Tags ("{{Current_Object_ID}}")/FDWFromTag

Note that the system has consumed the user input received via the user interface 300 and, by application of rules to that input, has created a protocol-compliant URL by formatting that input and adding it to the URL being built. Specifically, the system has added formatting marks including parenthesis, quotation marks, brackets and a slash, as specified by the OData specification. The rules implement requirements specified for the URL by the RESTful API protocol to which the URL is to comply so that the URL is a "protocol-compliant" URL. Application of such rules provides one or more advantages relative to having a human create or type the URL, including removing human subjectivity from the URL creation process, which human subjectivity is prone to introducing errors from the human's lack of understanding or experience with creating a protocol-compliant URL, and even including avoiding typographical errors in the created URL.

Figure 3B:
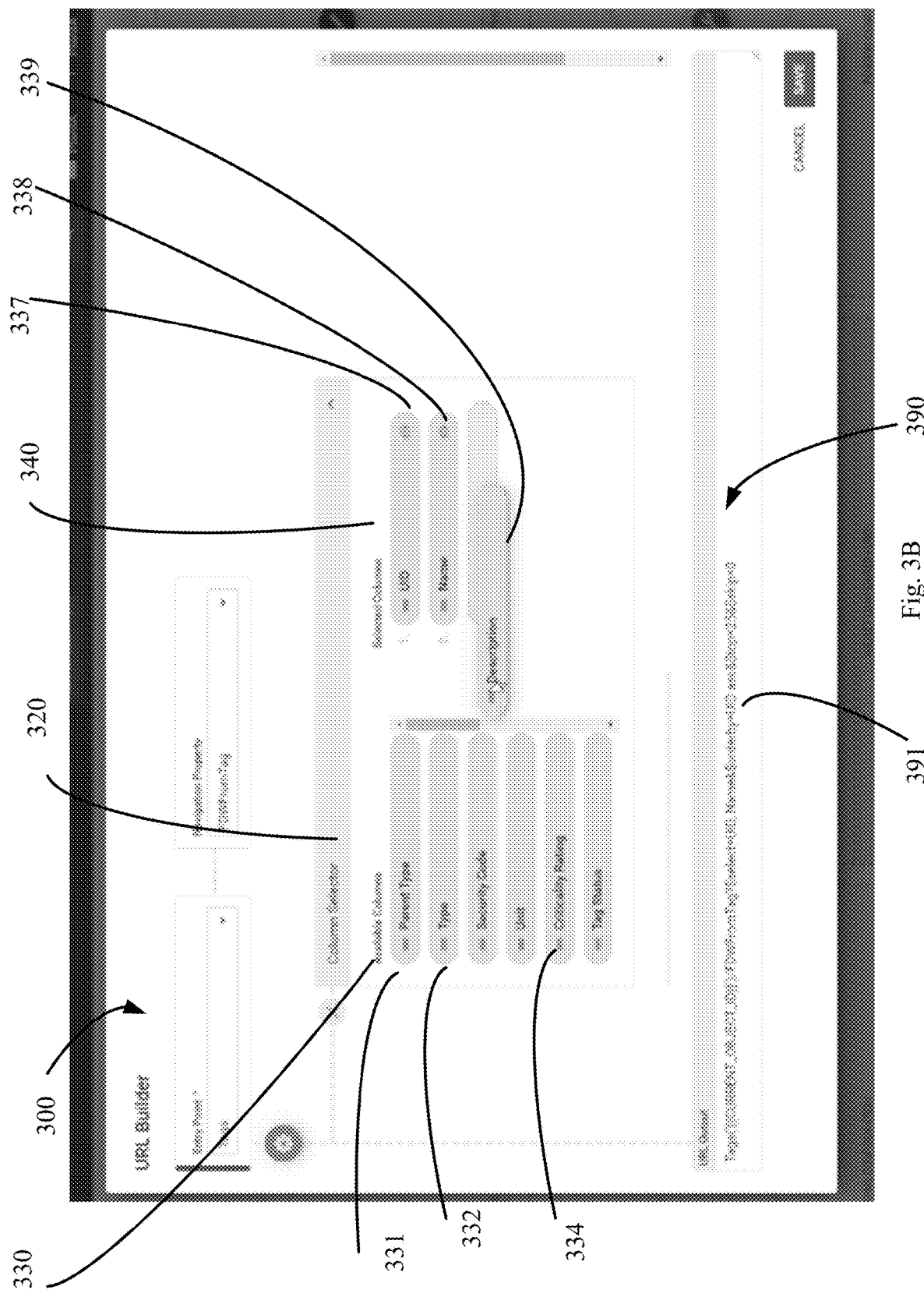
FIG. 3B schematically illustrates an embodiment of a screen of an embodiment of a graphical user interface.

Some embodiments provide a GUI that enables the user to specify that the responsive data includes only a subset of the source data. For example, FIG. 3B schematically illustrates an embodiment of a screen of an embodiment of a graphical user interface 300 by which the GUI 300 presents a "Column Selector" menu 320 having two windows. In in one window 330 captioned "Available Columns," a set of icons corresponding to data columns (or "entities" or "properties") available from the data service 120 (i.e., as specified by the data service 120 in its metadata document). In the example of FIG. 3B, the "Available Columns" window 330 includes, for example, an icon 331 for "Parent Type," and an icon 332 for "Type," and an icon for "Criticality Rating," among others. The user may specify a subset of source data to be included within the responsive data by dragging one or more of the column icons to a second window 340 captioned "Selected Columns." In this example, the user has dragged the "UID" icon 337 and the "Name" 338 icon to the second window 340 (and is in the process of dragging the "Description" icon 339 from the first window 330 to the second window 340). Referring now only to the example in which the user has dragged only the "UID" and "Name" icons to the second window, the method or system would consume that user input and produce the following OData-compliant URL:

Tags("{{Current_Object_ID}}")/FDWFromTag?select=UID, Name

Figure 3C:
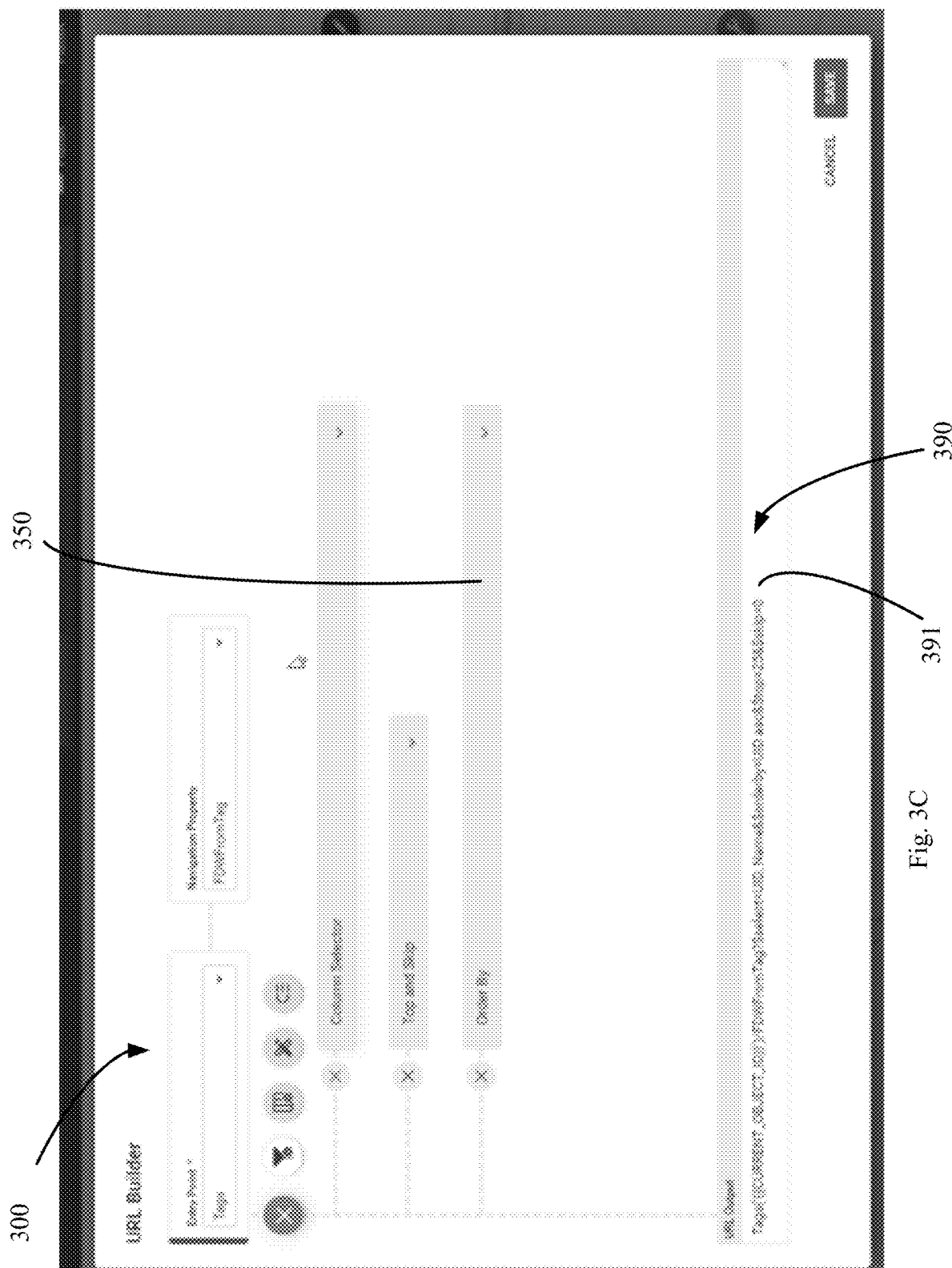
FIG. 3C schematically illustrates an embodiment of a screen of an embodiment of a graphical user interface.

Some embodiments enable a user to specify details of the form of responsive data. For example, FIG. 3C schematically illustrates an embodiment of a screen of an embodiment of a graphical user interface 300 that includes a graphical device 350 captioned "Order By." In illustrative embodiments, the "Order By" graphical device presents a listing of, for set of icons representing, the columns of data to be included in the responsive data. A user may specify (i.e., provide user input specifying) the arrangement of such columns within the responsive data by arranging the elements of the list, or arranging the icons, into the order in which the columns or source data within the responsive data are to be arranged. For an OData-compliant URL, such user input is formatted pursuant to the "$orderby" parameter.

Some embodiments enable a user to filter the data requested from and provided by the data service 120. Filtering may be specified by one or more filter input devices.

Figure 3D:
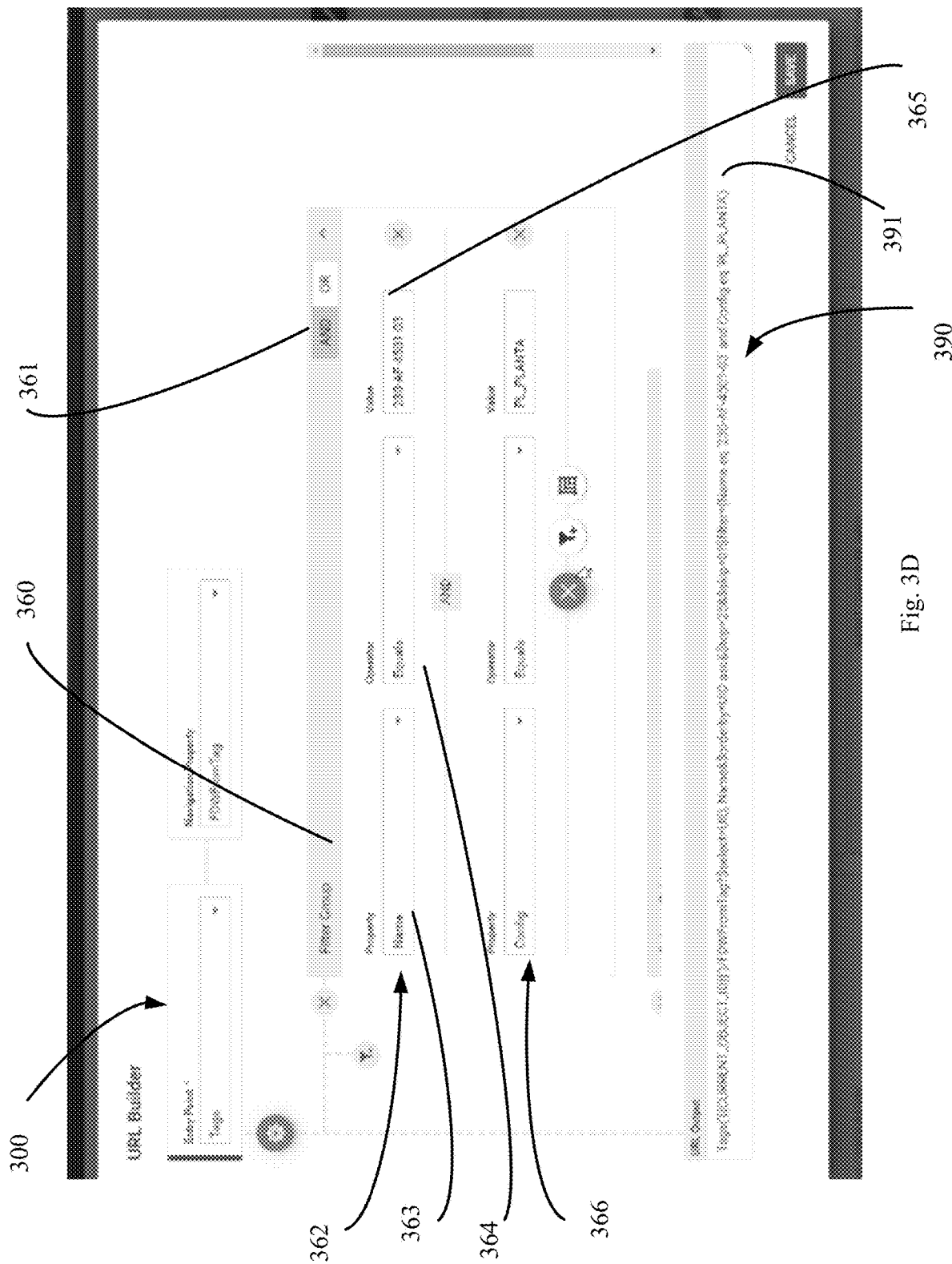
FIG. 3D schematically illustrates an embodiment of a screen of an embodiment of a graphical user interface.

For example, FIG. 3D schematically illustrates an embodiment of a screen of an embodiment of a graphical user interface 300 that includes a graphical device 360 captioned "Filter Group." The Filter Group device 360 is a drop-down menu that provides a second graphical device 362 having three graphical input devices: a "Property" drop-down menu 363, an "Operator" drop-down menu 364, and a "Value" input box 365.

The "Property" drop-down menu 363 is populated with properties as specified by the metadata document from the data service 120. A user may select, from the Property drop-down menu, a property associated with a data item (or data column) available from the data service 120. In alternative embodiments, the Property input device may be an alpha-numeric input device configured to receive typed input from the user to specify a property associated with a data item (or data column) available from the data service 120.

The "Value" input box 365 is configured to solicit and receive from the user specification of a datum on which the filter operates.

The "Operator" drop-down menu 364 solicits and receive from the user specification of an operator, such as "Equals" or "Not Equal," etc.

In the example of FIG. 3D, the user has specified the property as "Name," the value as "230-AF-4501-03," and the operator as "Equals." Those inputs instruct the data service 120 to omit from response data items that have the name "230-AF-4501-03."

In the example of FIG. 3D, the Filter Group device 360 provides a third graphical device 366 having three graphical input devices: another "Property" drop-down menu 363, another "Operator" drop-down menu 364, and another "Value" input box 365.

In the example of FIG. 3D, the user has specified the property as "Config," the value as "PL_PLANTA," and the operator as "Equals." Those inputs instruct the data service 120 to omit from response data items that have the "Config" value "PL_PLANTA."

The example of FIG. 3D also includes a filter concatenator 361 that enables a user to specify whether a plurality of defined filters are to operate conjunctively ("AND") or disjunctively ("OR"). In the example of FIG. 3D, the user has selected "AND."

In keeping with preceding examples, the method or system would consume that user input and produce the following OData-compliant URL:

Tags("{{Current_Object_ID}}")/
FDWFromTag?select=UID, Name&$orderby=UID ask &$top=25&$skip=0?$filter=(Name eq '230-AF-4501-03' and Config eq 'PL_PLANTA')

Note that, in constructing the foregoing OData-compliant URL, the method and system have consumed the user input by formatting that user input received via the user interface by adding elements specified by the OData specification (e.g., ampersands; Dollar signs, question marks, parenthesis, etc.) and added that formatted user input to the URL. Also, note that the foregoing OData-compliant URL also includes additional elements (e.g., "top" and "skip," which were specified by the user in user interface elements not shown in FIG. 3D).

Accordingly, a first embodiment of a method involving the embodiment of FIG. 3D provides a method of creating a uniform resource locator that complies with a RESTful API protocol (a "protocol-compliant" URL) at a computer remote from a data service. The method includes obtaining, from a metadata source, metadata describing source data available from the data service; customizing a graphical user interface ("GUI") by populating a set of graphical input devices within the GUI with information specified by the metadata, such that the GUI is configured to solicit and receive user input specifying a set of query options to request, from the data service, data available from the data service. The set of graphical input devices includes a set of filter input devices includes: (i) a first property input device configured to receive from a user specification of a first property of the source data; (ii) a first value input device corresponding to the property input device and configured to receive from the user specification of a first value; and (iii) a first operator input device corresponding to the first property input device and its corresponding first value input device and configured to receive from the user specification of a first operator to apply to the user input received, respectively, by the first property input device and the first value input device, the first property of the source data and the first value and the second operator defining a first filter.

The method further includes receiving user input via the graphical user interface; and generating the protocol-compliant uniform resource locator by application of a set of rules to the user input, the protocol-compliant uniform resource locator including the first filter configured to solicit from the data service a subset of the source data selected in accordance with the first value of the first property defined by the operator.

In some embodiments of a method, the first operator includes an EQUALS function, such that the filter is configured to generate a protocol-compliant uniform resource locator configured to solicit from the data service a subset of the source data, said subset having the value of the first property defined by the operator.

In some embodiments of a method, the first operator includes a NOT EQUALS function, such that the filter is configured to generate a protocol-compliant uniform resource locator configured to solicit from the data service a subset of the source data, said subset having a value of the property that is not equal to the first property defined by the operator.

In some embodiments of a method, the set of filter input devices further includes: (i) a second property input device configured to receive from a user specification of a second property of the source data; (ii) a second value input device corresponding to the second property input device and configured to receive from the user specification of a second value; and (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter. In such embodiments, the protocol-compliant uniform resource locator including, in addition to the first filter, the second filter configured to generate the protocol-compliant uniform resource locator configured to solicit from the data service a subset of the source data selected in accordance with the second value of the second property defined by the operator.

In some embodiments of a method, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter.

In some embodiments of a method, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter, the conjunction operator selected from one of: (a) an AND function, such that the protocol-compliant uniform resource locator is configured to solicit from the data service a subset of the source data selected, which subset is described by both the first filter and the second filter; and (b) an OR function, such that the protocol-compliant uniform resource locator is configured to solicit from the data service a subset of the source data selected, which subset is described by either of the first filter or the second filter, or is described by both the first filter and the second filter.

In some embodiments of a method, the graphical user interface further includes a URL output device configured to display a protocol-compliant URL that generated based on user input received by the graphical user interface.

Yet another embodiment involving the embodiment of FIG. 3D provides a computer-implemented system for creating a uniform resource locator that complies with a RESTful API protocol, said uniform resource locator being a "protocol-compliant" URL, for requesting source data from a data service. The system includes a communications interface configured to obtain, from a metadata source, metadata describing source data available from the data service; a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service. In such embodiments, the set of graphical input devices includes a set of filter input devices including: (i) a first property input device configured to receive from a user specification of a first property of the source data; (ii) a first value input device corresponding to the property input device and configured to receive from the user specification of a first value; and (iii) a first operator input device corresponding to the first property input device and its corresponding first value input device and configured to receive from the user specification of a first operator to apply to the user input received, respectively, by the first property input device and the first value input device, the first property of the source data and the first value and the second operator defining a first filter.

The system also includes a protocol-compliant URL generator configured: to receive user input including receipt of user in put via the set of filter input devices; and to apply a set of rules to the user input to produce, from said user input, a protocol-compliant URL.

In some embodiments of the system, the first operator includes an EQUALS function, such that the filter is configured to generate a protocol-compliant uniform resource locator configured to solicit from the data service a subset of the source data, said subset having the value of the first property defined by the operator.

In some embodiments of the system, the first operator includes a NOT EQUALS function, such that the filter is configured to generate a protocol-compliant uniform resource locator configured to solicit from the data service a subset of the source data, said subset having a value of the property that is not equal to the first property defined by the operator.

In some embodiments of the system, the set of filter input devices further includes: (i) a second property input device configured to receive from a user specification of a second property of the source data; (ii) a second value input device corresponding to the second property input device and configured to receive from the user specification of a second value; and (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter.

In such embodiments, the protocol-compliant uniform resource locator includes, in addition to the first filter, the second filter configured to generate the protocol-compliant uniform resource locator configured to solicit from the data service a subset of the source data selected in accordance with the second value of the second property defined by the operator.

In some embodiments of the system, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter.

In some embodiments of the system, the set of filter input devices further includes: (iv) a second property input device configured to receive from a user specification of a second property of the source data; (v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter, the conjunction operator selected from one of: (a) an AND function, such that the protocol-compliant uniform resource locator is configured to solicit from the data service a subset of the source data selected, which subset is described by both the first filter and the second filter; and (b) an OR function, such that the protocol-compliant uniform resource locator is configured to solicit from the data service a subset of the source data selected, which subset is described by either of the first filter or the second filter, or is described by both the first filter and the second filter.

In some embodiments of the system, the graphical user interface further includes a URL output device configured to display a protocol-compliant" URL that generated based on user input received by the graphical user interface.

Figure 3E:
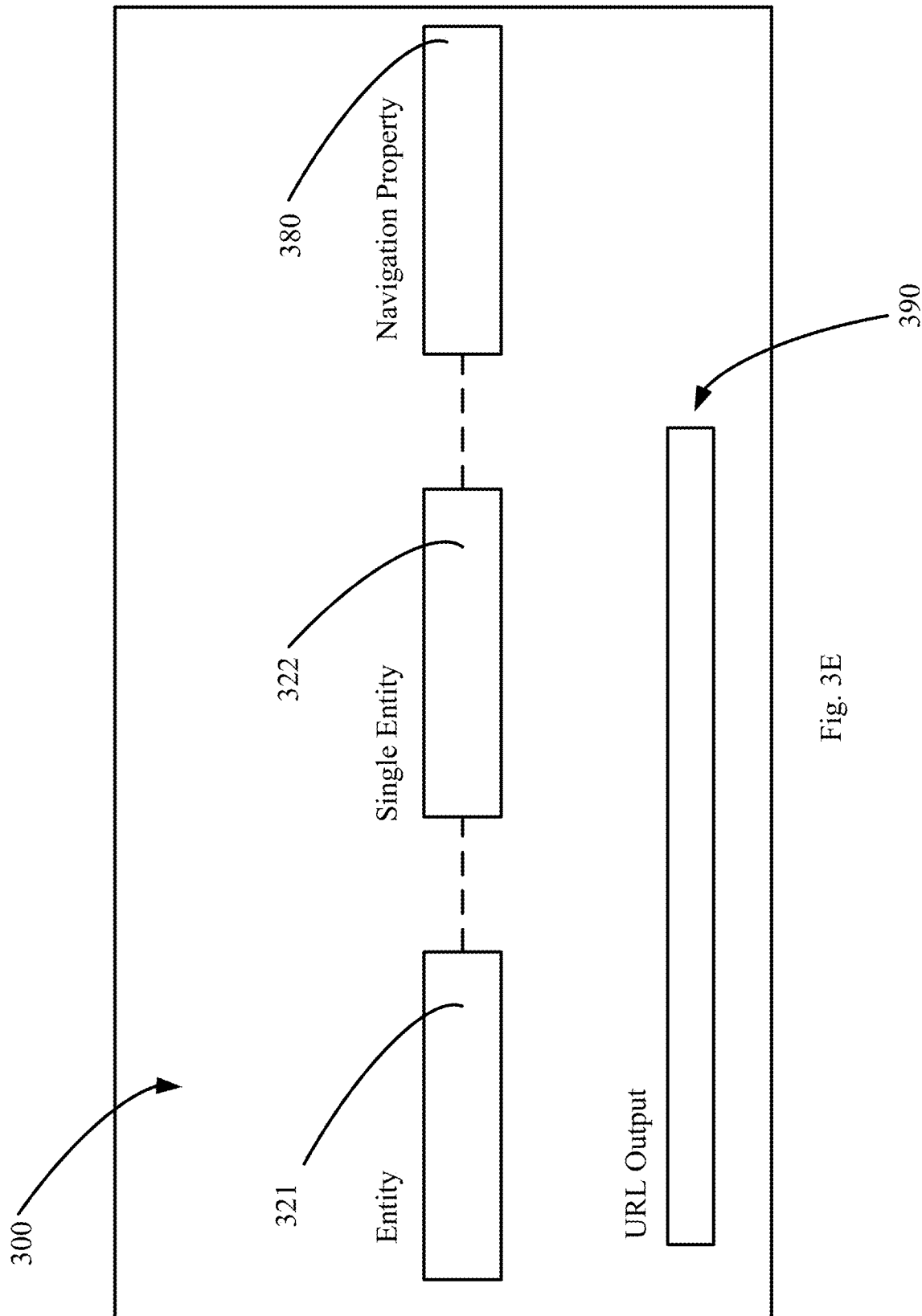
FIG. 3E schematically illustrates an embodiment of a screen of an embodiment of a graphical user interface.

FIG. 3E schematically illustrates an embodiment of a screen of an embodiment of a graphical user interface 300 to allow a user to specify a single object (or "single entity") of source data for inclusion in response data from the data service. In such an embodiment, the URL includes a starting entity which is the primary object type which describes the request. It is then possible to identify a single entity by supplying a unique identifier within the URL to restrict the response to only showing a single result.

Some embodiments allow a user to specify and retrieve a list of related items.

The embodiment of FIG. 3E includes a first graphical device 321 configured to receive from a user the user's specification of a column (or "category") of source data available from the data service, as specified by the metadata. In some embodiments, said first graphical device 321 may be referred-to as an "entity" graphical device. In some embodiments, the first graphical device 321 may be a drop-down menu for which the options in the drop-down menu are columns (or "categories") of source data available from the data service 120, as specified by the metadata. The first graphical device 321 is configured to receive, from a user, first user input specifying a category (or "entity") of the source data available from the data service, the category comprising a subset of said source data, the subset being less than all of the source data.

The embodiment of FIG. 3E also includes a second graphical input device 322 configured to receive, from the user, second user input specifying a single object of source data from the category specified by the user via the first graphical input device 321. In some embodiments, the second graphical input device 322 may be a drop-down menu for which the options of available single objects are objects available from the data service within the category, as specified by the metadata.

In operation of some illustrative embodiments, the GUI receives first user input via the first graphical input device, the first user input specifying the data column (which may be referred-to as the "selected" column), and second user input via the second graphical input device of the graphical user interface, the second user input specifying a single object within the selected column (which single object may be referred-to as the "primary" object or the "specified" object); and uses those inputs to generate a protocol-compliant uniform resource locator by application of a set of rules to the first user input and the second user input, wherein the protocol-compliant uniform resource locator is configured to request, from the data service, responsive data consisting of only the primary object.

Some illustrative embodiments produce a dummy URL that includes a placeholder for content which is subsequently added to the URL at runtime to produce the protocol-compliant URL. For example, at runtime the GUI may present to the user the "single entity" graphical input device 322 to solicit and receive from the user specification of the single entity. Upon receipt of the user's specification of the single entity via the "single entity" graphical input device 322, such illustrative methods and systems replace the placeholder in the dummy URL with the specified single entity, formatted according to the protocol pursuant to which the protocol-compliant URL is to be created, to produce the protocol-compliant URL.

Some embodiments may request, instead of only the primary object, a plurality of objects from the data service, including the primary object and other objects related to the primary object. To that end, some embodiments further include a "navigation property" graphical input device 380. If a user has chosen to pick a single object, a "navigation property" device 380 then becomes available to choose a relationship which can be expanded based on the primary entity. The navigation properties shown in the navigation property graphical input 380 are only valid for the primary entity and only appear once a single entity option has been chosen.

In illustrative embodiments, after each selection (entity, single entity, navigation property) the URL is automatically appended to and filtering, property selection and ordering by dynamically changed based on the new values driven from the metadata document.

Illustrative embodiments show, in the third graphical input 380, only navigation properties that are valid for (i.e., that identify other objects that are related to) the primary object. In some embodiments the third graphical input 380 is graphically presented in the graphical user interface 300 only after (and in response to) specification by the user of the primary object.

Illustrative embodiments consume the user's specification of the primary object and the navigation property to determine what other objects are related to the primary object. In such embodiments, specification, by a user, of a navigation property from the "navigation property" graphical input device 380 has the effect of expanding (or increasing) the scope or quantity of data from the data service to be included in responsive data, as opposed to narrowing the scope or quantity of data from the data service to be included in responsive data.

In operation, the GUI of such an embodiment receives first user input via the first graphical input device, the first user input specifying the data column (which may be referred-to as the "selected" column), and second user input via the second graphical input device of the graphical user interface, the second user input specifying a single object within the selected column (which single object may be referred-to as the "specified" object); and third user input specifying a set of navigation properties. Illustrative embodiments use those inputs to generate a protocol-compliant uniform resource locator by application of a set of rules to the first user input and the second user input and the third user input, wherein the protocol-compliant uniform resource locator is configured to request, from the data service, responsive data including not only the primary object, but also other objects from the specified category, which objects are related to the primary object.

Figure 5A:
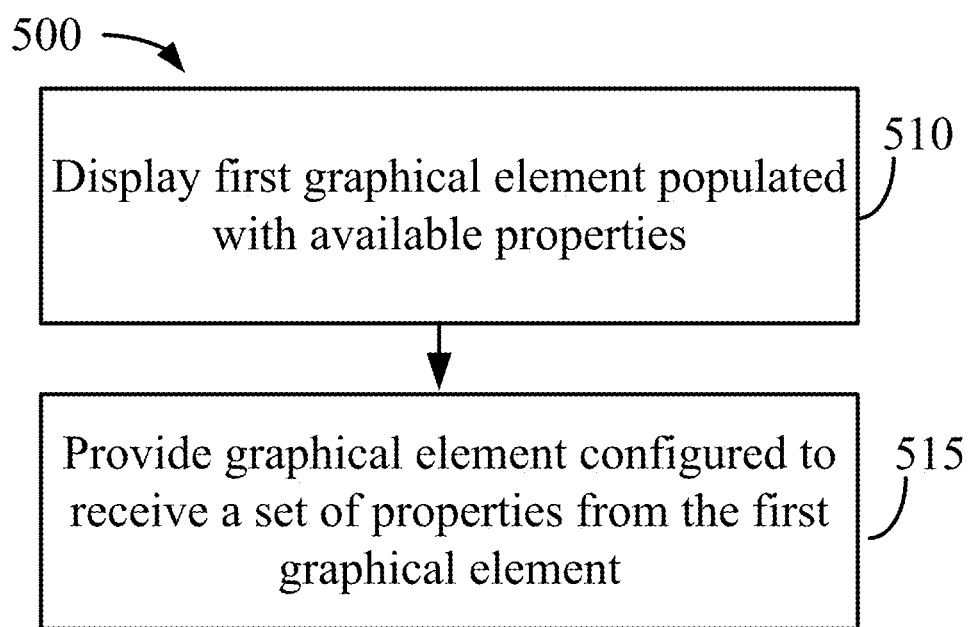
FIG. 5A is a flow chart illustrating generation of a graphical user interface to solicit properties from a user.

FIG. 5A is a flow chart illustrating a method 500 of configuring of a graphical user interface to solicit properties from a user. The steps of method 500 are an embodiment of step 220 of method 200. Illustrative embodiments provide an intuitive drag and drop mechanism that in turn will build up the $select and $orderby segments within a RESTful API-compliant URL without the need for the user to any knowledge of the RESTful API (e.g., OData) URL structures. By removing the complexity, and applying intelligent algorithms to the $metadata document, illustrative embodiment can remove errors, increase productivity and effectively in all parts of the process.

Method 500 may be illustrated using a graphical user interface such as the graphical user interface 320 schematically illustrated in FIG. 3B and described above, and/or using a graphical user interface such as the graphical user interface 320 schematically illustrated in FIG. 5B, FIG. 5C, FIG. 5D and FIG. 5E, and described below.

Figures 5B, 5C:
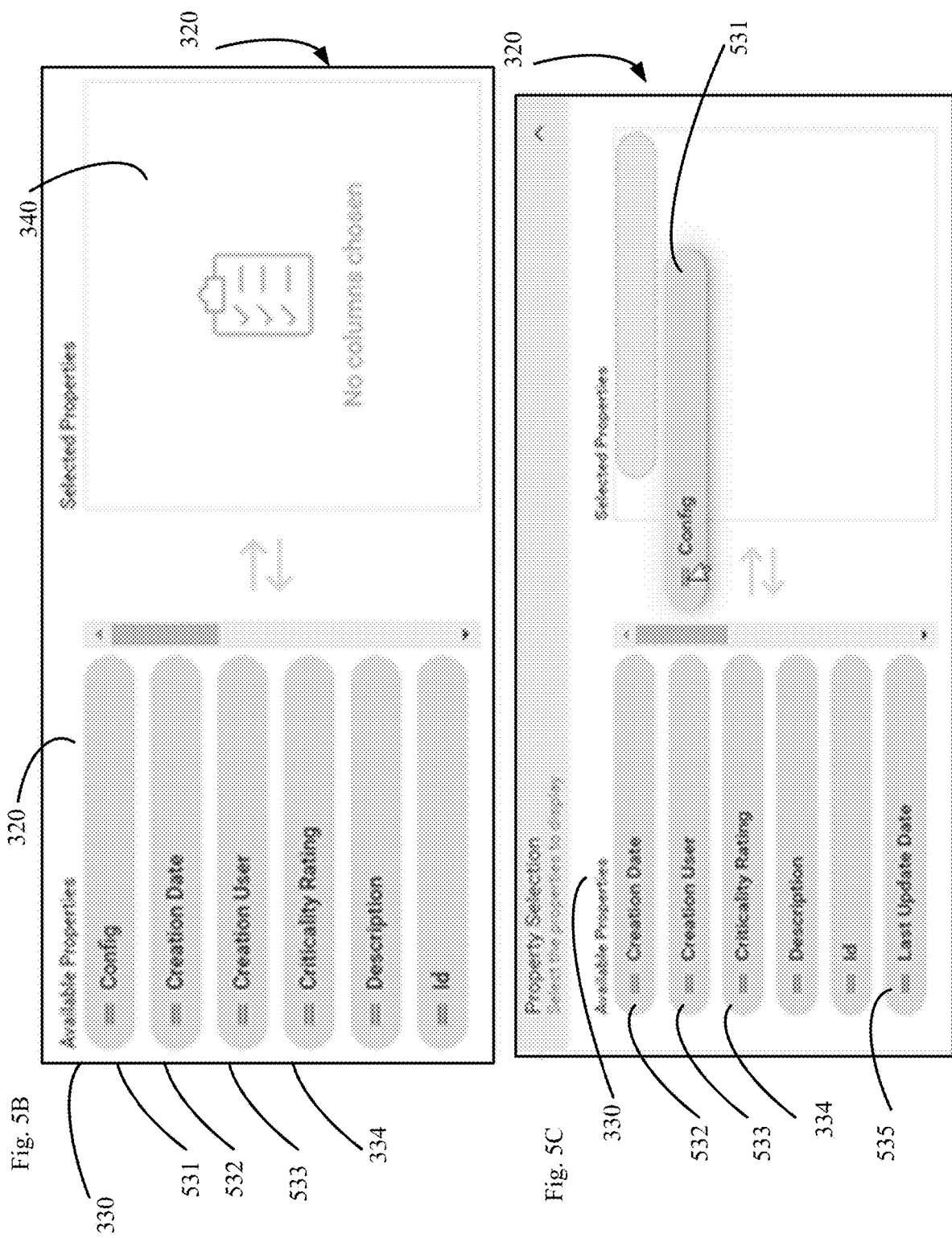

The graphical user interface 320 schematically illustrated in FIG. 5B, FIG. 5C, FIG. 5D and FIG. 5E is an embodiment of the graphical user interface 320 schematically illustrated in FIG. 3B, in which the term "property" in FIG. 5B, FIG. FIG. 5D and FIG. 5E means the same as the term "column" in FIG. 3B. Consequently, the terms "column" or "columns" as used in embodiments schematically illustrated in FIG. 3B may be used interchangeably with the terms "property" or "properties" as used in embodiments schematically illustrated in FIG. 5B, FIG. 5C, FIG. 5D and FIG. 5E. For example, in FIG. 5B, the first graphical device (or first graphical "element") 330 is labeled "Available Properties," whereas in FIG. 3B, the graphical input device (or "window") 330 is labeled "Available Columns." Also, in FIG. 5B, the second graphical device (or second graphical "element") 340 is labeled "Selected Properties," whereas in FIG. 3B, the "Selected Columns" widow 340 is labeled "Selected Columns." The term "property icon" has the same meaning as the term "column icon."

Note that in FIG. 5B, the second graphical device (or second graphical "element") 340 is empty (i.e., no columns or "properties" have yet been moved into the second graphical device 340), and so is labeled "No columns chosen."

Step 510 includes generating and displaying a first graphical device (or first graphical "element") 330 populated with available properties, wherein each property is represented by a graphical icon. Each graphical icon representing an available property is selectable and movable by a user using the graphical user interface 520, for example by clicking-on and dragging the icon.

Step 515 includes generating and displaying a second graphical device (or second graphical "element") 340 configured to receive a set of properties selected by a user (which may be referred-to as "selected properties") and moved from the first graphical device 330 to the second graphical device 340.

In the embodiment of FIG. 5A, customizing the graphical user interface includes populating and displaying first graphical element with a set of properties, each property of the set of properties associated with corresponding data available from the data service, and each property of the set of properties specified by the metadata from the metadata source; and providing a second graphical element configured to receive one or more properties dragged from the first graphical element and dropped into the second graphical element.

FIG. 5B, FIG. 5C, FIG. 5D and FIG. 5E each schematically illustrates an embodiment of a graphical user interface configured to receiver user input selecting properties for a protocol-compliant URL.

In illustrative embodiments, the action of dragging an item (e.g., a property icon) left to right causes inclusion in the $select/$orderby and resulting appendage to URL. For a user this is far more intuitive, simple and familiar than hand typing a technical OData expression. Only valid properties for the API entity can be selected and the user is not required to type or format them. This provides a speedy and accurate path to achieving a valid OData URL.

FIG. 5B schematically illustrates a graphical user interface 520 for soliciting and receiving from a user selection of properties. The graphical user interface 520 includes a first graphical device 330 populated with available properties (in this example, icons 531, 532, 533 and 334), wherein each property is represented by a graphical icon. Only properties valid for the URL in view of the Restful API protocol associated with the URL are disclosed. Each 'property' icon (or "column" icon) may be referred-to as a "chip." Each chip also has a drag handle, that allows a user to drag the property over to the right-hand side. Each graphical icon represents an available property and each graphical icon is selectable and movable by a user using the graphical user interface 520, for example by clicking-on and dragging the icon.

The graphical user interface 520 also includes a second graphical device 340 configured to receive a set of one or more properties selected by a user and moved from the first graphical device 330 to the second graphical device 340. The second graphical device 340 shows the properties that have been selected (dragged over) by the user. These are numbered to indicate the order of which they will appear in the URL. As described below, they can be dragged to be re-ordered or removed by dragging back to the left.

FIG. 5C schematically illustrates a graphical icon 531, representing a "config" property, which in FIG. 5C is a selected property in the process of being dragged from the first graphical device 330 to the second graphical device 340. FIG. 5C includes, in the first graphical device 330, another property icon 535 ("Last Update Date") to show that the property ("Last Update Date") associated with icon 535 is available to be selected.

FIG. 5D schematically illustrates the graphical user interface 520 in which a plurality of property icons 531 ("Config"), 334 ("Criticality Rating"), 533 ("Creation User"), and 535 ("Last Update Date") have been selected and placed (e.g., dragged and dropped from the first graphical device 330) into the second graphical device 340. In some embodiments, each property icon in the second graphical device 340 is numbered to indicate the position of its corresponding property in the URL.

FIG. 5E schematically illustrates a graphical user interface 520 that provides to the user the ability to order the icons (in this example, icons 531, 533, 334, 545) representing the selected properties in the second graphical device 340. This embodiment includes a graphical sort icon (or sort button) 541 that, when activated (e.g., clicked-on) by the user causes the system to arrange the sort or order those icons. For example, in the embodiment of FIG. 5E, activating the sort button 541 causes the system to arrange and display the icons representing the selected properties in the second graphical device 340 in alphabetical order (i.e., ascending). In other embodiments, activating the sort button 541 causes the system to arrange and display the icons representing the selected properties in the second graphical device 340 in reverse alphabetical order (i.e., descending).

In some embodiments, the sort direction (ascending or descending) can be different per property. For some properties, the sort icon causes the properties to display in an ascending order (e.g., as schematically illustrated in FIG. 5E), and for some properties, the sort icon causes the properties to display in an descending order. In illustrative embodiments, the sort direction is set by default but can be changed with a simple click on the icon 541 for the other direction.

In the context of the method 200 in view of method 500, a method of creating a uniform resource locator that complies with a RESTful API protocol (a "protocol-compliant" URL) at a computer remote from a data service, includes obtaining, from a metadata source, metadata describing source data available from the data service; customizing a graphical user interface ("GUI") by populating a set of graphical input devices within the GUI with information specified by the metadata, such that the GUI is configured to solicit and receive user input specifying a set of query options to request, from the data service, data available from the data service, wherein customizing the graphical user interface comprises: populating and displaying first graphical element with a set of properties, each property of the set of properties associated with corresponding data available from the data service, and each property of the set of properties specified by the metadata from the metadata source; and providing a second graphical element configured to receive one or more properties dragged from the first graphical element and dropped into the second graphical element; receiving user input via the graphical user interface, the user input comprising receipt at the second graphical element of at least one property of the set of properties dragged from the first graphical element and dropped into the second graphical element; and generating the protocol-compliant uniform resource locator by application of a set of rules to the user input, the protocol-compliant uniform resource locator configured to solicit from the data source response data defined by the user input.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of creating a uniform resource locator that complies with a RESTful API protocol (a "protocol-compliant" URL) at a computer remote from a data service, the method comprising:
  obtaining, from a metadata source, metadata describing source data available from the data service;
  customizing a graphical user interface ("GUI") by populating a set of graphical input devices within the GUI with information specified by the metadata, such that the GUI is configured to solicit and receive user input specifying a set of query options to request, from the data service, data available from the data service;
  receiving user input via the graphical user interface; and
  generating the protocol-compliant uniform resource locator by application of a set of rules to the user input.

P2. The method of P1, wherein the metadata source is the data service.

P3. The method of any of P1-P2, wherein a rule from the set of rules comprises formatting the user input into a format defined by the RESTful API protocol.

P4. The method of any of P1-P3, wherein a rule from the set of rules comprises adding, to the user input, a prefix defined by the RESTful API protocol.

P5. The method of any of P1-P4, wherein generating the protocol-compliant uniform resource locator by application of a set of rules to the user input comprises, for at least one item of user input:
  appending a prefix to said user input and adding the prefix and user input to the protocol-compliant uniform resource locator.

P6. The method of any of P1-P5, wherein:
  the metadata describes a plurality of categories of source data available from the available from the data service;
  customizing a graphical user interface comprises providing a drop-down menu having a plurality of menu items, wherein each menu item of the plurality of menu items corresponds to a corresponding category from the plurality of categories of source data;
  receiving user input via the graphical user interface comprises receiving user selection, via the drop-down menu, of a category from the plurality of categories of source data, which category is the selected category; and
  generating the protocol-compliant uniform resource locator by application of a set of rules to the user input comprises formatting the selected category into a format defined by the RESTful API protocol, which protocol-compliant uniform resource locator will cause the data service to provide the selected category as responsive data.

P7. The method of any of P1-P6, further comprising:
  customizing a graphical user interface comprises providing a second graphical input device configured to receive a second parameter, which second parameter further limits the data of the selected category provided as responsive data; and wherein
  receiving user input via the graphical user interface comprises receiving such a second parameter; and wherein
  generating the protocol-compliant uniform resource locator by application of a set of rules to the user input comprises formatting said second parameter into a format defined by the RESTful API protocol such that protocol-compliant uniform resource locator is configured to cause the data service to provide responsive data comprising a subset of selected category as responsive data, said subset limited by the second parameter.

P8. The method of any of P1-P7, wherein:
  customizing a graphical user interface comprises providing a third graphical input device configured to receive user input specifying a set of filters, wherein each filter further limits the data of the selected category provided as responsive data; and wherein
  receiving user input via the graphical user interface comprises receiving user specification of each filter in the set of filters; and wherein
  generating the protocol-compliant uniform resource locator by application of a set of rules to the user input comprises formatting said specification of each filter in the set of filters into a format defined by the RESTful API protocol, such that protocol-compliant uniform resource locator is configured to cause the data service to provide, as responsive data, a filtered subset of source data from the selected category.

P9. The method of any of P1-P8, wherein:
  at least one item of user input comprises an instruction to the data service to place, into a specified order, source data provided to the client by the data service in response to receipt, by the data service of the protocol-compliant uniform resource locator; and
  generating the protocol-compliant uniform resource locator by application of a set of rules to the user input comprises formatting said specification of order into a format defined by the RESTful API protocol, such that protocol-compliant uniform resource locator is configured to cause the data service to provide responsive data arranged in the specified order.

P10. A system for creating a uniform resource locator that complies with a RESTful API protocol (a "protocol-compliant" URL) for enabling a client to request specified data held at a remote data service as source data, the system comprising:
  a graphical user interface driver configured to create graphical user interface data ("GUI data") configured to present, to a user, a customized graphical user interface configured to solicit, from the user, user input;
  a GUI data receiver configured to receive, via the graphical user interface, user input to specify source data to be retrieved from the data service; and a protocol-compliant URL generator configured to apply a set of rules to the user input to produce, from said user input, a protocol-compliant URL.

P11. The system of P10, wherein:
  the system is disposed at the data service; and
  the data service further comprises a communications interface configured to send the protocol-compliant URL across a network work to the client.

P12. The system of any of P10-P11, wherein the system is disposed at the client.

P13. The system of any of P10-P12, wherein:
the system is disposed at the client; and
the system further comprises a communications interface configured to solicit and receive, from the data service, metadata identifying categories of source data available from the data service; and wherein
the graphical user interface driver is configured to customize the graphical user interface by populating the graphical user interface with said categories such that the user may specify, via the graphical user interface, a set of categories of data for retrieval from the data service; and wherein
the protocol-compliant URL generator is configured to format said set of categories of data into a format defined by the RESTful API protocol such that said protocol-compliant URL is configured to cause the data service to include, in responsive data, data from said categories of data.

P14. The system of any of P10-P13, wherein the protocol-compliant URL generator configured is to apply a set of rules to the user input by:
adding, to the user input, a prefix defined by the RESTful API protocol.

P15. The system of any of P10-P14, wherein the protocol-compliant URL generator configured is to apply a set of rules to the user input by:
appending a prefix to said user input; and
adding said user input with appended prefix to the protocol-compliant uniform resource locator.

P16. A computer program product comprising non-volatile executable code, the non-volatile executable code comprising:
code for reading, from a metadata source, metadata describing source data available from the data service;
code for customizing a graphical user interface ("GUI") by populating a set of graphical input devices within the GUI with information specified by the metadata document, such that the GUI is configured to solicit and receive user input specifying a set of query options to request, from the data service, data available from the data service;
code for receiving user input via the graphical user interface; and code for generating the protocol-compliant uniform resource locator by application of a set of rules to the user input.

P17. The computer program product of P16, wherein a rule from the set of rules comprises formatting the user input into a format defined by the RESTful API protocol.

P18. The computer program product of any of P16-P17, wherein a rule from the set of rules comprises adding, to the user input, a prefix defined by the RESTful API protocol.

P19. The computer program product of any of P16-P18, wherein the metadata describes a plurality of categories of source data available from the available from the data service, and:
code for customizing a graphical user interface comprises code for providing a drop-down menu having a plurality of menu items, wherein each menu item of the plurality of menu items corresponds to a corresponding category from the plurality of categories of source data;
code for receiving user input via the graphical user interface comprises code for receiving user selection, via the drop-down menu, of a category from the plurality of categories of source data, which category is the selected category; and
code for generating the protocol-compliant uniform resource locator by application of a set of rules to the user input comprises code for formatting the selected category into a format defined by the RESTful API protocol, which protocol-compliant uniform resource locator will cause the data service to provide the selected category as responsive data.

P20. The computer program product of any of P16-P19, wherein at least one item of user input comprises an instruction to the data service to place, into a specified order, source data provided to the client by the data service in response to receipt, by the data service, of the protocol-compliant uniform resource locator; and wherein:
code for generating the protocol-compliant uniform resource locator by application of a set of rules to the user input comprises code for formatting said specification of order into a format defined by the RESTful API protocol, such that protocol-compliant uniform resource locator is configured to cause the data service to provide responsive data arranged in the specified order.

P201: A method of creating a uniform resource locator that complies with a RESTful API protocol (a "protocol-compliant" URL) at a computer remote from a data service, the method comprising:
obtaining, from a metadata source, metadata describing source data available from the data service;
customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
a first graphical input device configured to receive, from a user, first user input specifying a category of the source data available from the data service, the category comprising a subset of said source data, the subset being less than all of the source data; and
a second graphical input device configured to receive, from the user, second user input specifying a single object of source data from the category;
receiving first user input via the first graphical input device and second user input via the second graphical input device of the graphical user interface; and
generating the protocol-compliant uniform resource locator by application of a set of rules to the first user input and the second user input, said protocol-compliant URL configured to solicit from the data service the single object of source data.

P202: The method of P201, wherein said protocol-compliant URL is configured to solicit from the data service only the single object of source data.

P203: The method of P201, wherein:
the set of graphical input devices within the GUI further comprises a third graphical input device configured to receive, from a user, specification of a navigation property, the navigation property defining a relationship between the single object and a set of other objects at the data source, such that the single object and each object in the set of other objects is related to one another; and wherein:
the protocol-compliant URL is configured to solicit from the data service the single object of source data along with a set of objects related to the single object of source data.

P204. The method of any of P201-P203, wherein the second graphical input device is configured to accept second user input comprising a user specification of a single object of source data from a limited and pre-specified set comprising a plurality of items of source data.

P205. The method of any of P201-P204, wherein each category of the source data available from the data service has an associated pre-specified set comprising a plurality of items of source data, and:
the second graphical input device comprises a drop-down menu configured to present to the user a listing of the pre-specified set of the plurality of items of source data, and wherein:
the pre-specified set of the plurality of items of source data is selected based on a prior specification, by the user, of first user input specifying a category of the source data available from the data service.

P206. The method of any of P201-P205, wherein the metadata source is the data service.

P207. The method of any of P201-P206, wherein application of a rule from the set of rules comprises applying a rule that formats the user input into a format defined by the RESTful API protocol.

P208. The method of any of P201-P207, wherein application of a rule from the set of rules comprises adding, to the user input, a prefix defined by the RESTful API protocol.

P209. The method of any of P201-P208, wherein generating the protocol-compliant uniform resource locator by application of a set of rules to the user input comprises, for at least one item of user input:
appending a prefix to said user input and adding the prefix and user input to the protocol-compliant uniform resource locator.

P210. A system for creating a uniform resource locator that complies with a RESTful API protocol (a "protocol-compliant" URL) for enabling a client to request specified data held at a remote data service as source data, the system comprising:
a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
a first graphical input device configured to receive, from a user, first user input specifying a category of the source data available from the data service, the category comprising a subset of said source data, the subset being less than all of the source data; and
a second graphical input device configured to receive, from the user, second user input specifying a single object of source data from the category;
a GUI data receiver configured to receive, via the graphical user interface, first user input via the first graphical input device and second user input via the second graphical input device of the graphical user interface; and
a protocol-compliant URL generator configured to apply a set of rules to the first user input and the second user input to produce, from said user input, the protocol-compliant URL, said protocol-compliant URL configured to solicit from the data service the single object of source data.

P211. The system of P210, wherein the second graphical input device is configured to accept second user input comprising a user specification of a single object of source data from a limited and pre-specified set comprising a plurality of items of source data.

P212. The system of any of P210-P211, wherein each category of the source data available from the data service has an associated pre-specified set comprising a plurality of items of source data, and:
the second graphical input device comprises a drop-down menu configured to present to the user a listing of the pre-specified set of the plurality of items of source data, and wherein the metadata source is the data service.
the pre-specified set of the plurality of items of source data is selected based on a prior specification, by the user, of first user input specifying a category of the source data available from the data service.

P213. The system of any of P210-P212, wherein the metadata source is the data service.

P214. The system of any of P210-P213, wherein application of a rule from the set of rules comprises applying a rule that formats the user input into a format defined by the RESTful API protocol.

P215. The system of any of P210-P214, wherein application of a rule from the set of rules comprises adding, to the user input, a prefix defined by the RESTful API protocol.

P216. The system of any of P210-P215, wherein generating the protocol-compliant uniform resource locator by application of a set of rules to the user input comprises, for at least one item of user input:
appending a prefix to said user input and adding the prefix and user input to the protocol-compliant uniform resource locator.

P217. The system of any of P210-P216, wherein said protocol-compliant URL is configured to solicit from the data service only the single object of source data.

P218. The system of any of P210-P217, wherein:
the set of graphical input devices within the GUI further comprises a third graphical input device configured to receive, from a user, specification of a navigation property, the navigation property defining a relationship between the single object and a set of other objects at the data source, such that the single object and each object in the set of other objects is related to one another; and wherein:
the protocol-compliant URL is configured to solicit from the data service the single object of source data along with a set of objects related to the single object of source data.

P221. A non-transitory computer-readable medium having computer code thereon, the computer code configured to be executed by a computer, the computer code comprising:
code for causing the computer to obtain, from a metadata source, metadata describing source data available from the data service;

code for causing the computer to present a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices within the GUI comprises:
- a first graphical input device configured to receive, from a user, first user input specifying a category of the source data available from the data service, the category comprising a subset of said source data, the subset being less than all of the source data; and
- a second graphical input device configured to receive, from the user, second user input specifying a single object of source data from the category;

code for causing the computer to receive first user input via the first graphical input device and second user input via the second graphical input device of the graphical user interface; and code for causing the computer to generate the protocol-compliant uniform resource locator by application of a set of rules to the first user input and the second user input, said protocol-compliant URL configured to solicit from the data service the single object of source data.

P222. The non-transitory computer-readable medium of P221, wherein the second graphical input device is configured to accept second user input comprising a user specification of a single object of source data from a limited and pre-specified set comprising a plurality of items of source data.

P223. The non-transitory computer-readable medium of any of P221-P222, wherein each category of the source data available from the data service has an associated pre-specified set comprising a plurality of items of source data, and:
- the second graphical input device comprises a drop-down menu configured to present to the user a listing of the pre-specified set of the plurality of items of source data, and wherein:
- the pre-specified set of the plurality of items of source data is selected based on a prior specification, by the user, of first user input specifying a category of the source data available from the data service.

P224. The non-transitory computer-readable medium of any of P221-P223, wherein the metadata source is the data service.

P225. The non-transitory computer-readable medium of any of P221-P224, wherein application of a rule from the set of rules comprises applying a rule that formats the user input into a format defined by the RESTful API protocol.

P226. The non-transitory computer-readable medium of any of P221-P225, wherein application of a rule from the set of rules comprises at least one of:
- adding, to the user input, a prefix defined by the RESTful API protocol; and
- appending a prefix to said user input and adding the prefix and user input to the protocol-compliant uniform resource locator.

P227: The non-transitory computer-readable medium of any of P221-P226, wherein said protocol-compliant URL is configured to solicit from the data service only the single object of source data.

P228: The non-transitory computer-readable medium of any of P221-P226, wherein:
- the set of graphical input devices within the GUI further comprises a third graphical input device configured to receive, from a user, specification of a navigation property, the navigation property defining a relationship between the single object and a set of other objects at the data source, such that the single object and each object in the set of other objects is related to one another; and wherein:
- the protocol-compliant URL is configured to solicit from the data service the single object of source data along with a set of objects related to the single object of source data.

P301. A method of creating a uniform resource locator that complies with a RESTful API protocol (a "protocol-compliant" URL) at a computer remote from a data service, the method comprising:
- obtaining, from a metadata source, metadata describing source data available from the data service;
- customizing a graphical user interface ("GUI") by populating a set of graphical input devices within the GUI with information specified by the metadata, such that the GUI is configured to solicit and receive user input specifying a set of query options to request, from the data service, data available from the data service;
- receiving user input via the graphical user interface; and
- generating the protocol-compliant uniform resource locator by application of a set of rules to the user input;
- presenting, at a URL output device of a graphical user interface, said uniform resource locator;
- receiving user edits to the uniform resource locator to create a user-edited URL;
- identifying errors in the user-edited URL that cause the user-edited URL to fail to comply with the RESTful API protocol; and
- identifying to the user a set of features in the user-edited URL that cause the user-edited URL to fail to comply with the RESTful API protocol.

P310. A computer-implemented system for creating a uniform resource locator that complies with a RESTful API protocol, said uniform resource locating being a protocol-compliant URL, for enabling a client to request specified data held at a remote data service as source data, the system comprising:
- a graphical user interface driver configured to create graphical user interface data ("GUI data") configured to present, to a user, a customized graphical user interface configured to solicit, from the user, user input,
- a GUI data receiver configured to receive, via the graphical user interface, user input to specify source data to be retrieved from the data service;
- a protocol-compliant URL generator configured to apply a set of rules to the user input to produce, from said user input, a protocol-compliant URL;
- the graphical user interface driver farther configured to:
- present, at a URL output device of a graphical user interface, said protocol-compliant URL;
- receive user edits to the protocol-compliant URL to create a user-edited URL;

the system further configured to identify errors in the user-edited URL that cause the user-edited URL to fail to comply with the RESTful API protocol; and the graphical user interface driver farther configured to present, at the URL output device of a graphical user interface, a set of features in the user-edited URL that cause the user-edited URL to fail to comply with the RESTful API protocol.

P315. A non-transitory computer-readable medium having computer code thereon, the computer code configured to be executed by a computer, the computer code comprising:

code for reading, from a metadata source, metadata describing source data available from a data service;

code for customizing a graphical user interface ("GUI") by populating a set of graphical input devices within the GUI with information specified by the metadata document, such that the GUI is configured to solicit and receive user input specifying a set of query options to request, from the data service, data available from the data service;

code for receiving user input via the graphical user interface;

code for generating the protocol-compliant uniform resource locator by application of a set of rules to the user input;

code for presenting, at a URL output device of the graphical user interface, said protocol-compliant uniform resource locator;

code for receiving user edits to the protocol-compliant uniform resource locator to create a user-edited URL;

code for identifying errors in the user-edited URL that cause the user-edited URL to fail to comply with the RESTful API protocol; and code for identifying to the user a set of features in the user-edited URL that cause the user-edited URL to fail to comply with the RESTful API protocol.

A listing of certain reference numbers is presented below.

100: System employing tailored URL (e.g., OData-compliant URL; OpenAPI-compliant URL);
110: Client system;
120: Data service or datasource (e.g., OData service; OpenAPI service);
130: Communication network;
140: URL developer;
141: Communications interface;
142: Computer processor;
143: Computer memory;
144: GUI driver;
145: URL builder;
146: User interface;
147: Parser;
300: Graphical User Interface ("GUI");
310: Graphical input device;
320: "Column Selector" graphical input device;
321: "Entity" graphical input device;
322: "Single Entity" graphical input device;
330: "Available Columns" graphical input device;
331: "Parent Type" icon;
332: "Type" icon;
337: "UID" icon;
338: "Name" icon;
339: "Description" icon;
340: "Selected Columns" widow;
350: "Order By" graphical input device;
360: "Filter Group" device
361: Filter concatenator selector;
362: Second graphical device;
363: "Property" drop-down menu;
364: "Operator" drop-down menu;
365: "Value" input box;
366: Third graphical device;
380: "Navigation Property" input device;
390: URL output device;
391: URL;
392: Text indicating feature of URL that renders URL non-compliant;
393: Arrow or line identifying feature of URL that renders URL non-compliant;
395: Graphical indicator indicating that the URL is compliant;
500: Property selection graphical user interface;
330: Available properties menu graphical device;
340: Selected properties graphical input device;
541: Sort button.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP, or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transient computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments described above are intended to be merely exemplary; numerous variations and modifications will be apparent to those skilled in the art. All such variations and modifications are intended to be within the scope of the present disclosure as defined in any appended claims.

What is claimed is:

1. A method of creating a uniform resource locator that complies with a RESTful API protocol (a "protocol-compliant" URL) at a computer remote from a data service, the method comprising:
   obtaining, from a metadata source, metadata describing source data available from the data service;
   customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices comprises a set of filter input devices including:
      (i) a first property input device configured to receive from a user specification of a first property of the source data;
      (ii) a first value input device corresponding to the first property input device and configured to receive from the user specification of a first value; and
      (iii) a first operator input device corresponding to the first property input device and its corresponding first value input device and configured to receive from the user specification of a first operator to apply to the user input received, respectively, by the first property input device and the first value input device, the first property of the source data and the first value and the first operator defining a first filter;
   receiving user input via the graphical user interface; and
   generating the protocol-compliant uniform resource locator by application of a set of rules to the user input, the protocol-compliant uniform resource locator including the first filter configured to solicit from the data service a subset of the source data selected in accordance with the first value of the first property defined by the operator.

2. The method of claim 1, wherein the first operator comprises an EQUALS function, such that the filter is configured to generate a protocol-compliant uniform resource locator configured to solicit from the data service a subset of the source data, said subset having the value of the first property defined by the operator.

3. The method of claim 1, wherein the first operator comprises a NOT EQUALS function, such that the filter is configured to generate a protocol-compliant uniform resource locator configured to solicit from the data service a subset of the source data, said subset having a value of the property that is not equal to the first property defined by the operator.

4. The method of claim 1, wherein the set of filter input devices further includes:
   (i) a second property input device configured to receive from a user specification of a second property of the source data;
   (ii) a second value input device corresponding to the second property input device and configured to receive from the user specification of a second value; and
   (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter;
   the protocol-compliant uniform resource locator including, in addition to the first filter, the second filter configured to generate the protocol-compliant uniform resource locator configured to solicit from the data service a subset of the source data selected in accordance with the second value of the second property defined by the operator.

5. The method of claim 1, wherein the set of filter input devices further includes:
   (iv) a second property input device configured to receive from a user specification of a second property of the source data;
   (v) a second value input device corresponding to the second property input device and configured to receive from the user specification of a second value; and
   (vi) a second operator input device corresponding to the second property input device and its corresponding second value input device and configured to receive from the user specification of a second operator to apply to the user input received, respectively, by the second property input device and the second value input device; and
   (vii) a conjunction input device configured to receive from the user specification of a conjunction operator specifying a functional relationship between the first filter and the second filter.

6. The method of claim 1, wherein the set of filter input devices further includes:
   (iv) a second property input device configured to receive from a user specification of a second property of the source data;
   (v) a second value input device corresponding to the second property input device and configured to receive from the user specification of a second value; and
   (vi) a second operator input device corresponding to the second property input device and its corresponding second value input device and configured to receive from the user specification of a second operator to apply to the user input received, respectively, by the second property input device and the second value input device; and
   (vii) a conjunction input device configured to receive from the user specification of a conjunction operator specifying a functional relationship between the first filter and the second filter, the conjunction operator selected from one of:
      (a) an AND function, such that the protocol-compliant uniform resource locator is configured to solicit from the data service a subset of the source data selected, which subset is described by both the first filter and the second filter; and
      (b) an OR function, such that the protocol-compliant uniform resource locator is configured to solicit from the data service a subset of the source data selected, which subset is described by either of the first filter or the second filter, or is described by both the first filter and the second filter.

7. The method of claim 1, wherein the graphical user interface further comprises a URL output device configured to display a protocol-compliant URL that generated based on user input received by the graphical user interface.

8. A computer-implemented system for creating a uniform resource locator that complies with a RESTful API protocol, said uniform resource locator being a "protocol-compliant" URL, for requesting source data from a data service, the system comprising:
- a communications interface configured to obtain, from a metadata source, metadata describing source data available from the data service;
- a graphical user interface driver configured to customize a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices comprises a set of filter input devices including:
  - (i) a first property input device configured to receive from a user specification of a first property of the source data;
  - (ii) a first value input device corresponding to the property input device and configured to receive from the user specification of a first value; and
  - (iii) a first operator input device corresponding to the first property input device and its corresponding first value input device and configured to receive from the user specification of a first operator to apply to the user input received, respectively, by the first property input device and the first value input device, the first property of the source data and the first value and the first operator defining a first filter;
- a protocol-compliant URL generator configured:
  - to receive user input comprising receipt of user input via the set of filter input devices; and
  - to apply a set of rules to the user input to produce, from said user input, a protocol-compliant URL.

9. The system of claim 8, wherein the first operator comprises an EQUALS function, such that the filter is configured to generate a protocol-compliant uniform resource locator configured to solicit from the data service a subset of the source data, said subset having the value of the first property defined by the operator.

10. The system of claim 8, wherein the first operator comprises a NOT EQUALS function, such that the filter is configured to generate a protocol-compliant uniform resource locator configured to solicit from the data service a subset of the source data, said subset having a value of the property that is not equal to the first property defined by the operator.

11. The system of claim 8, wherein the set of filter input devices further includes:
  - (i) a second property input device configured to receive from a user specification of a second property of the source data;
  - (ii) a second value input device corresponding to the second property input device and configured to receive from the user specification of a second value; and
  - (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter;
- the protocol-compliant uniform resource locator including, in addition to the first filter, the second filter configured to generate the protocol-compliant uniform resource locator configured to solicit from the data service a subset of the source data selected in accordance with the second value of the second property defined by the operator.

12. The system of claim 8, wherein the set of filter input devices further includes:
  - (iv) a second property input device configured to receive from a user specification of a second property of the source data;
  - (v) a second value input device corresponding to the second property input device and configured to receive from the user specification of a second value; and
  - (vi) a second operator input device corresponding to the second property input device and its corresponding second value input device and configured to receive from the user specification of a second operator to apply to the user input received, respectively, by the second property input device and the second value input device; and
  - (vii) a conjunction input device configured to receive from the user specification of a conjunction operator specifying a functional relationship between the first filter and the second filter.

13. The system of claim 8, wherein the set of filter input devices further includes:
  - (iv) a second property input device configured to receive from a user specification of a second property of the source data;
  - (v) a second value input device corresponding to the second property input device and configured to receive from the user specification of a second value; and
  - (vi) a second operator input device corresponding to the second property input device and its corresponding second value input device and configured to receive from the user specification of a second operator to apply to the user input received, respectively, by the second property input device and the second value input device; and
  - (vii) a conjunction input device configured to receive from the user specification of a conjunction operator specifying a functional relationship between a first filter and the second filter, the conjunction operator selected from one of:
    - (a) an AND function, such that the protocol-compliant uniform resource locator is configured to solicit from the data service a subset of the source data selected, which subset is described by both the first filter and the second filter; and
    - (b) an OR function, such that the protocol-compliant uniform resource locator is configured to solicit from the data service a subset of the source data selected, which subset is described by either of the first filter or the second filter, or is described by both the first filter and the second filter.

14. The system of claim 8, wherein the graphical user interface further comprises a URL output device configured to display a protocol-compliant URL that generated based on user input received by the graphical user interface.

15. A non-transitory computer-readable medium having computer code thereon, the computer code configured to be executed by a computer, the computer code causing the computer to execute a method comprising:

obtaining, from a metadata source, metadata describing source data available from the data service;

customizing a graphical user interface ("GUI") by populating a set of graphical input devices within the GUI with information specified by the metadata, such that the GUI is configured to solicit and receive user input specifying a set of query options to request, from the data service, data available from the data service, wherein the set of graphical input devices comprises a set of filter input devices including:

(i) a first property input device configured to receive from a user specification of a first property of the source data;

(ii) a first value input device corresponding to the property input device and configured to receive from the user specification of a first value; and (iii) a first operator input device corresponding to the first property input device and its corresponding first value input device and configured to receive from the user specification of an operator to apply to the user input received, respectively, by the first property input device and the first value input device, the first property of the source data and the first value and the first operator defining a first filter;

receiving user input via the graphical user interface; and generating the protocol-compliant uniform resource locator by application of a set of rules to the user input, the protocol-compliant uniform resource locator including the first filter configured to solicit from the data service a subset of the source data selected in accordance with the first value of the first property defined by the operator.

16. The non-transitory computer-readable medium of claim 15, wherein the first operator comprises an EQUALS function, such that the filter is configured to generate a protocol-compliant uniform resource locator configured to solicit from the data service a subset of the source data, said subset having the value of the first property defined by the operator.

17. The non-transitory computer-readable medium of claim 15, wherein the first operator comprises a NOT EQUALS function, such that the filter is configured to generate a protocol-compliant uniform resource locator configured to solicit from the data service a subset of the source data, said subset having a value of the property that is not equal to the first property defined by the operator.

18. The non-transitory computer-readable medium of claim 15, wherein the set of filter input devices further includes:

(i) a second property input device configured to receive from a user specification of a second property of the source data;

(ii) a second value input device corresponding to the second property input device and configured to receive from the user specification of a second value; and (iii) a second operator input device corresponding to the second property input device and its corresponding second value input device and configured to receive from the user specification of a second operator to apply to the user input received, respectively, by the second property input device and the second value input device, the second property of the source data and the second value and the second operator defining a second filter;

the protocol-compliant uniform resource locator including, in addition to the first filter, the second filter configured to generate the protocol-compliant uniform resource locator configured to solicit from the data service a subset of the source data selected in accordance with the second value of the second property defined by the operator.

19. The non-transitory computer-readable medium of claim 15, wherein the set of filter input devices further includes:

(iv) a second property input device configured to receive from a user specification of a second property of the source data;

(v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter.

20. The non-transitory computer-readable medium of claim 15, wherein the set of filter input devices further includes:

(iv) a second property input device configured to receive from a user specification of a second property of the source data;

(v) a second value input device corresponding to the second property input device and configured to receive from the user specification of a second value; and (vi) a second operator input device corresponding to the second property input device and its corresponding second value input device and configured to receive from the user specification of a second operator to apply to the user input received, respectively, by the second property input device and the second value input device; and (vii) a conjunction input device configured to receive from the user specification of a conjunction operator specifying a functional relationship between a first filter and the second filter, the conjunction operator selected from one of:

(a) an AND function, such that the protocol-compliant uniform resource locator is configured to solicit from the data service a subset of the source data selected, which subset is described by both the first filter and the second filter; and (b) an OR function, such that the protocol-compliant uniform resource locator is configured to solicit from the data service a subset of the source data selected, which subset is described by either of the first filter or the second filter, or is described by both the first filter and the second filter.

\* \* \* \* \*